(12) United States Patent
Escudero Rodriguez et al.

(10) Patent No.: US 12,289,044 B2
(45) Date of Patent: Apr. 29, 2025

(54) POWER CONVERTER HAVING A SOLID-STATE TRANSFORMER AND A HALF BRIDGE CONVERTER STAGE FOR EACH ISOLATED DC OUTPUT OF THE SOLID-STATE TRANSFORMER

(71) Applicant: Infineon Technologies Austria AG, Villach (AT)

(72) Inventors: Manuel Escudero Rodriguez, Villach (AT); Matteo-Alessandro Kutschak, Ludmannsdorf (AT); Alessandro Pevere, Villach (AT); David Meneses Herrera, Helsinki (FI)

(73) Assignee: Infineon Technologies Austria AG, Villach (AT)

( * ) Notice: Subject to any disclaimer, the term of this patent is extended or adjusted under 35 U.S.C. 154(b) by 335 days.

(21) Appl. No.: 18/072,065

(22) Filed: Nov. 30, 2022

(65) Prior Publication Data

US 2024/0178741 A1  May 30, 2024

(51) Int. Cl.
*H02M 1/00* (2007.01)
*H02M 1/42* (2007.01)
(Continued)

(52) U.S. Cl.
CPC ......... *H02M 1/007* (2021.05); *H02M 1/0009* (2021.05); *H02M 1/0043* (2021.05);
(Continued)

(58) Field of Classification Search
CPC .... H02M 1/0043; H02M 1/007; H02M 1/009; H02M 3/285; H02M 3/33561
See application file for complete search history.

(56) References Cited

U.S. PATENT DOCUMENTS 8,693,213 B2 * 4/2014 Jungreis ............... H02M 1/4241
363/17
2009/0015071 A1 1/2009 Iwata et al.
(Continued)

FOREIGN PATENT DOCUMENTS

CN 104078992 A 10/2014

OTHER PUBLICATIONS

Chen, Yanhu, et al., "Reconfigurable Power Converter for Constant Current Underwater Observatory", Electronics 2020, 9, 307, Feb. 10, 2020, pp. 1-18.
(Continued)

*Primary Examiner* — Gary A Nash
(74) *Attorney, Agent, or Firm* — Murphy, Bilak & Homiller, PLLC

(57) ABSTRACT

A power converter includes: a solid-state transformer having a DC input and isolated DC outputs; a half bridge converter stage for each isolated DC output of the solid-state transformer, wherein an input of each half bridge converter stage is connected to the corresponding isolated DC output and an output of the half bridge converter stages are electrically connected in a cascade configuration; an output inductor shared by the half bridge converter stages and configured to deliver an output current; and a controller configured to implement phase shift control of the half bridge converter stages relative to one another, based on the number of half bridge converter stages and an output voltage of the power converter being regulated, such that each half bridge converter stage processes the full output current but only a fraction of the output voltage. Methods of controlling the power converter are also described.

20 Claims, 23 Drawing Sheets

(51) Int. Cl.
  *H02M 3/00* (2006.01)
  *H02M 3/28* (2006.01)
  *H02M 3/335* (2006.01)

(52) U.S. Cl.
  CPC ........... *H02M 1/4233* (2013.01); *H02M 3/01* (2021.05); *H02M 1/009* (2021.05); *H02M 3/285* (2013.01); *H02M 3/33561* (2013.01)

(56) References Cited

U.S. PATENT DOCUMENTS

| | | | | |
|---|---|---|---|---|
| 2011/0316514 | A1* | 12/2011 | Deboy | ............... G05F 1/46 323/312 |
| 2013/0343089 | A1* | 12/2013 | Gupta | ............... H02M 7/49 363/16 |
| 2014/0175888 | A1* | 6/2014 | Deboy | ............... H02M 7/49 307/82 |
| 2017/0099008 | A1 | 4/2017 | Keister et al. | |
| 2017/0197730 | A1 | 7/2017 | Lutze et al. | |
| 2020/0136517 | A1* | 4/2020 | Dai | ............... H02M 3/1582 |
| 2020/0195125 | A1 | 6/2020 | Slepchenkov | |
| 2021/0152095 | A1* | 5/2021 | Lin | ............... H02M 3/33573 |

OTHER PUBLICATIONS

Wu, Xiqi, et al., "A Wide Output Voltage Range LLC Resonant Converter Based on Topology Reconfiguration Method", IEEE Journal of Emerging and Selected Topics in Power Electronics, vol. 10, No. 1, Feb. 2022, pp. 969-983.

* cited by examiner

POWER CONVERTER HAVING A SOLID-STATE TRANSFORMER AND A HALF BRIDGE CONVERTER STAGE FOR EACH ISOLATED DC OUTPUT OF THE SOLID-STATE TRANSFORMER

BACKGROUND

For high voltage battery charging applications, a very wide range at the output is typically required to support different types of batteries with the same charger or converter. A battery charging system with such characteristics typically has two stages: a front-end PFC (power factor correction) stage and a back-end isolation DCDC converter. The front-end PFC stage provides power factor correction and pre-regulation of an intermediate bus voltage which is input to the back-end isolation DCDC converter. The back-end isolation DCDC converter provides a more tightly regulated output and safety isolation among other functions, e.g., battery charging profiles.

Other battery charging systems have three stages: the front-end PFC stage; an intermediate solid-state transformer; and a back-end post regulation stage. The intermediate solid-state transformer provides safety isolation and step-down or step-up conversion fixed by the transformer ratio. The back-end post regulation stage provides a more tightly regulated output and other functions, e.g., battery charging profiles.

In both approaches, the main constraint is the very wide output requirement that jeopardizes the design of the regulation stages and normally compromises the overall achievable efficiency of the system along the output voltage range of the converter. A common approach to this problem is a converter which can be reconfigured by adding auxiliary switches and implementing additional working modes. However, the utilization of the components is only partial in each of the working modes in such a converter. That is, only some of the switches are used in each of the configurations. Other solutions use a multi-cell converter which can be reconfigured from parallel to series, therefore effectively multiplying the output range by the number of stages. However, a multi-cell converter requires bidirectional switches such as mechanical relays or semiconductor devices with blocking capability in both directions.

Thus, there is a need for an improved power converter for battery charging applications with a very wide output range.

SUMMARY

According to an embodiment of a power converter, the power converter comprises: a solid-state transformer having a DC input and a plurality of isolated DC outputs; a half bridge converter stage for each isolated DC output of the solid-state transformer, wherein an input of each half bridge converter stage is connected to the corresponding isolated DC output and an output of the half bridge converter stages are electrically connected in a cascade configuration; an output inductor shared by the half bridge converter stages and configured to deliver an output current; and a controller configured to implement phase shift control of the half bridge converter stages relative to one another, based on the number of half bridge converter stages and an output voltage of the power converter being regulated, such that each half bridge converter stage processes the full output current but only a fraction of the output voltage.

According to an embodiment of a method of controlling a power converter that includes a solid-state transformer having a DC input and a plurality of isolated DC outputs, a half bridge converter stage for each isolated DC output of the solid-state transformer, wherein an input of each half bridge converter stage is connected to the corresponding isolated DC output and an output of the half bridge converter stages are electrically connected in a cascade configuration, and an output inductor shared by the half bridge converter stages and configured to deliver an output current, the method comprising: implementing phase shift control of the half bridge converter stages relative to one another, based on the number of half bridge converter stages and an output voltage of the power converter being regulated, such that each half bridge converter stage processes the full output current but only a fraction of the output voltage.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a power converter system that includes an intermediate pre-regulation stage having bidirectional and cross-regulation capability, and a post-regulation stage. The intermediate pre-regulation stage may be realized by a solid-state transformer, e.g., such as a series resonant converter or dual-active bridge having a DC input and two or more isolated DC outputs. The post-regulation stage may include a half bridge converter stage for each isolated DC output of the solid-state transformer. The input of each half bridge converter stage is connected to the corresponding isolated DC output and the output of the half bridge converter stages are electrically connected in a cascade configuration. An output inductor shared by the half bridge converter stages delivers an output current.

The power converter described herein allows for a size reduction by sharing an inductor across the converters of the post-regulation stage. Optimum utilization of the shared inductor is realized by using the modulation scheme described herein.

Described next, with reference to the figures, are various embodiments of the power converter and modulation scheme.

Figure 1:
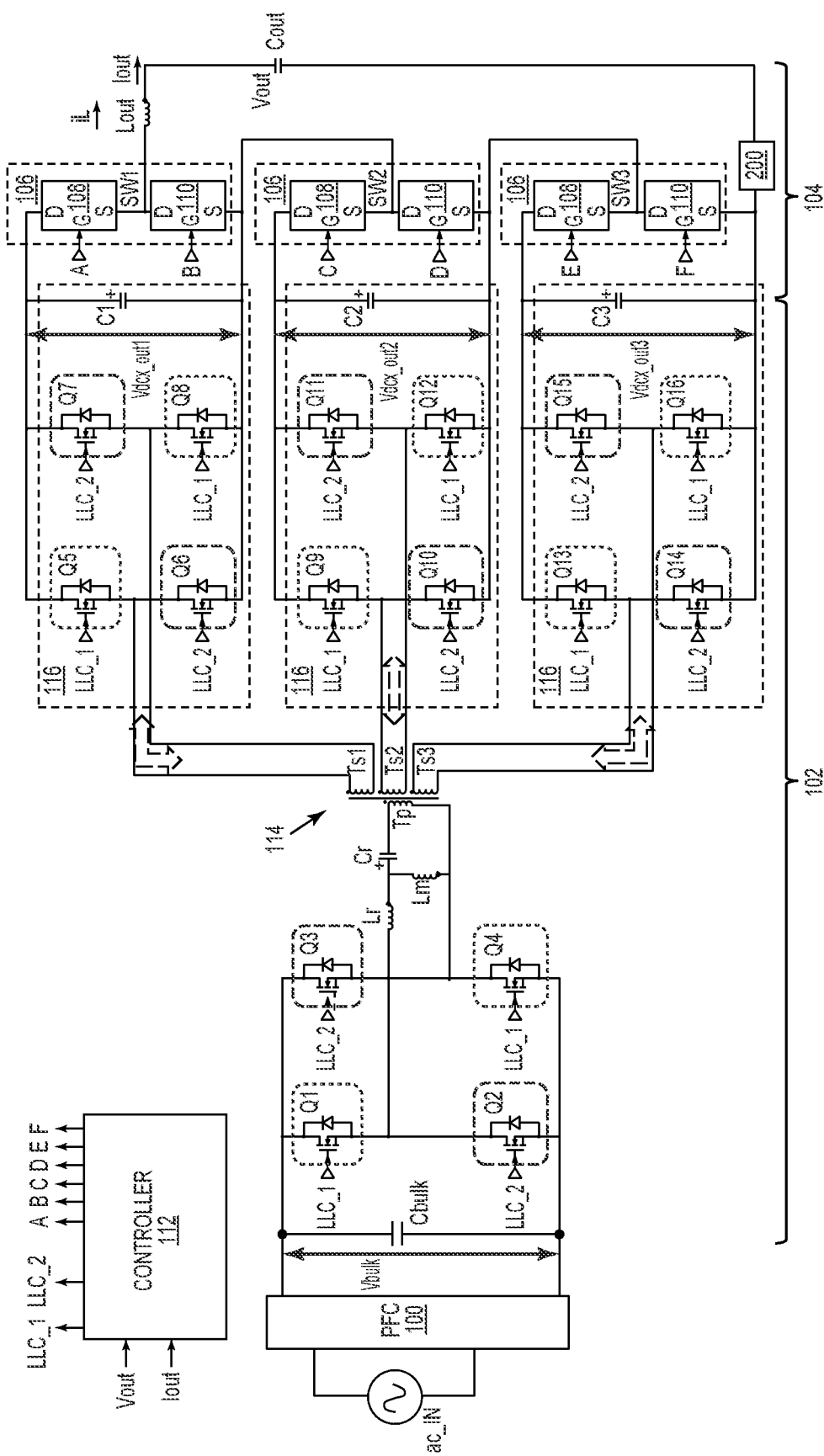
FIG. 1 illustrates an embodiment of a power converter system that includes an intermediate pre-regulation stage having bidirectional and cross-regulation capability and a post-regulation stage that shares a common output inductor.

FIG. 1 illustrates an embodiment of an off-line power supply system such as a battery charger. The off-line power supply system includes a front-end PFC stage 100 coupled to a power converter. The front-end PFC stage 100 transforms an AC voltage source 'ac_IN' into an intermediate bus DC voltage Vbulk across an input or bulk capacitor Cbulk of the power converter, and further provides power factor correction and may pre-regulate the intermediate bus DC voltage Vbulk.

The power converter includes a solid-state transformer 102 that has the intermediate bus DC voltage Vbulk as an input and two or more isolated DC outputs Vdcx_out1 . . . Vdcx_outN. The power converter also includes a series buck converter 104 coupled to the solid-state transformer 102. In one embodiment, the series buck converter 104 includes a half bridge converter stage 106 for each isolated DC output Vdcx_out1 . . . Vdcx_outN of the solid-state transformer 102. The input of each half bridge converter stage 106 is connected to the corresponding isolated DC output Vdcx_out1 . . . Vdcx_outN which is regulated. Accordingly, the half bridge converter stages 106 of the series buck converter 104 may be considered post-regulator converter stages.

An output capacitor C1 . . . CN of each DCX stage 116 provides a stable input for the corresponding post-regulator half bridge converter stage 106. In one example, a foil capacitor in a range of 10 µF may be used as the DCX stage output capacitors C1 . . . CN.

Three (3) isolated DC outputs Vdcx_out1 . . . Vdcx_outN and three (3) corresponding post-regulator half bridge converter stages 106 are shown in FIG. 1. This is just an example. More generally, the solid-state transformer 102 may have two (2) or more isolated DC outputs Vdcx_out1 . . . Vdcx_outN and the series buck converter 104 has the same number of post-regulator half bridge converter stages 106 as isolated DC outputs Vdcx_out1 . . . Vdcx_outN. In each case, the output of the post-regulator half bridge converter stages 106 are electrically connected in a cascade configuration.

In FIG. 1, each post-regulator half bridge converter stage 106 has a high-side switch device 108 such as a power MOSFET (metal-oxide-semiconductor field-effect transistor), IGBT (insulated gate bipolar transistor), etc. and a low-side switch device 110 such as a power MOSFET, IGBT, etc. The drain/collector 'D' of each high-side switch device 108 is electrically connected to the high-side terminal of the respective DCX output capacitor C1 . . . CN and the source/emitter 'S' of the corresponding low-side switch device 110 is electrically connected to the low-side terminal of the DCX output capacitor C1 . . . CN. The source/emitter 'S' of each high-side switch device 108 and the drain/collector 'D' of the corresponding low-side switch device 110 are electrically connected to one another to form a switched node or phase output SW1 . . . SWN for the respective half bridge converter stages 106. The switched node/phase output of the bottom (lowermost) post-regulator half bridge converter stage 106 is electrically connected to the source/emitter 'S' of the low-side switch device 110 of the next post-regulator half bridge converter stage 106 and so-on to realize the cascade connection.

The power converter also includes an output inductor Lout that is shared by the post-regulator half bridge converter stages 106 and delivers an output current iL. In FIG. 1, the output inductor Lout is implemented as a single physical inductor connected to the output of the top (uppermost) post-regulator half bridge converter stage 106 in the cascade configuration. For example, the single physical inductor may be wound on a powder material toroid or a ferrite core, with many possible core geometries such as POT, EC, EE, PQ, ETD, etc.

The power converter further includes a controller 112 that implements phase shift control of the post-regulator half bridge converter stages 106 relative to one another to control the output voltage Vout and/or output current Iout of the system, based on the number of half bridge converter stages 106 and the output voltage Vout of the power converter being regulated, such that each half bridge converter stage 106 processes the full output inductor current iL but only a fraction of the output voltage Vout.

The solid-state transformer 102 of the power converter may have any type of DC topology that behaves as a DCX (DC transformer). For example, the solid-state transformer 102 may have an LLC topology, dual active bridge topology, etc. The solid-state transformer 102 provides galvanic isolation via a transformer 114 having a primary winding Tp on the primary-side of the solid-state transformer 102 and a secondary winding Ts1 . . . TsN for each post-regulator half bridge converter stage 106 coupled to the secondary-side of the solid-state transformer 102. The solid-state transformer 102 may provide further regulation of the intermediate bus DC voltage Vbulk across the input/bulk capacitor Cbulk of the power converter.

In FIG. 1, the primary side of the solid-state transformer 102 is implemented as a full-bridge resonant converter formed by switch devices Q1 through Q4 and a resonant LLC tank formed by a resonant capacitor Cr, the leakage inductance Lr of the primary-side transformer winging Tp, and the magnetizing inductance Lm of the primary-side transformer winging Tp. The LLC tank of the solid-state transformer 102 effectively filters out harmonics, providing a sinusoidal like voltage and current waveform.

The solid-state transformer 102 is bidirectional as indicated by the dashed lines with double arrows in FIG. 1, and supports multiple phases on the secondary side. Each DCX stage 116 on the secondary side of the solid-state transformer 102 includes switch devices Q5-Q8, Q9-Q12, Q13-Q16 that are configured to rectify the voltage across the corresponding secondary winding T1 . . . TN. The output capacitor C1 . . . CN of each DCX stage 116 provides a stable input for the corresponding post-regulator half bridge converter stage 106. For example, a foil capacitor in the range of 10 µF may be used as the DCX stage capacitors C1 . . . CN. The post-regulator half bridge converter stages 106 do not require independent output capacitors, with any required filtering be implemented at the output of the complete system.

In one embodiment, the solid-state transformer 102 is controlled by the controller 112 at a fixed frequency, via corresponding gate signals LLC_1, LLC_2 applied to the switch devices Q1-Q4 of the full-bridge resonant converter. For example, the DC input Vbulk to the solid-state transformer 102 may be in a range of 380 Vdc to 440 Vdc and the controller 112 may regulate the output voltage Vout of the power converter to a voltage in a range of 200 Vdc to 900 Vdc by appropriate control of the gate signals 'A' through 'F' applied to the series buck converter 104 together with signals LLC_1, LLC_2 applied to the switch devices Q1-Q4 of the full-bridge resonant converter. The modulation technique for the series buck converter control signals 'A' through 'F' implemented by the controller 112 may be performed in an interleaved manner, by phase shifting PWM (pulse width modulation) the gate signals 'A' through 'F' provided to the individual post-regulator half bridge converter stages 106.

Regarding the rectification provided by the DCX stages 116, a very high efficiency may be achieved by operating the resonant converter on the primary side of the solid-state transformer 102 at a fixed conversion ratio and turning on and off with soft-switching in the primary and secondary side switch devices Q1-Q16 of the solid-state transformer 102. For example, efficiencies in the range of 99% may be achieved. The controller 112 may control the primary-side switch devices Q1-Q4 and the secondary-side switch devices Q5-Q16 of the solid-state transformer 102 using the same PWM signals LLC_1, LLC_2. The controller 112 controls the switch devices 108, 110 of the post-regulator half bridge converter stages 106 using a different set of signals 'A' through 'F' input to the respective gates 'G' of the half bridge switch devices 108, 110.

As explained above, the number of post-regulator half bridge converter stages 106 may be two (2) or more than two (2). The higher the number of post-regulator half bridge converter stages 106, the wider the output range that can be covered, or alternatively, the lower the voltage class needed for the switch devices Q5-Q16 included in the DCX rectification stages 116 of the solid-state transformer 102 and the switch devices 108, 110 included in the post-regulator half bridge converter stages 106. For example, if the maximum output voltage Vout of the system is 900 Vdc and there are three (3) post-regulator half bridge converter stages 106, the input Vdcx_out1 . . . Vdcx_out3 of each half bridge converter stage 106 may be at least 300 Vdc. However, if there are four (4) post-regulator half bridge converter stages 106, then the input Vdcx_out1 . . . Vdcx_out4 of each half bridge converter stage 106 may be at least 225 Vdc.

Each post-regulator half bridge converter stage 106 processes the full output inductor current iL of the system but only a portion of the output voltage Vout. Accordingly, each post-regulator half bridge converter stage 106 processes a portion of the total output power. The efficiency of the series buck converter 104 therefore is equal to the efficiency of the individual post-regulator half bridge converter stages 106. Furthermore, with lower input voltage Vdcx_out1 . . . Vdcx_outN to the post-regulator half bridge converter stages 106, the lower the switching losses of the semiconductor devices 108, 110 of the post-regulator half bridge switch devices 108, 110 and the higher the efficiency that may be achieved per post-regulator stage 106 and per the overall series buck converter 104. Accordingly, efficiencies in the range of 99% are achievable using, e.g., wide band gap switch devices such as SiC or GaN switch devices for the post-regulator half bridge converter stages 106.

For example, the input voltage Vbulk of the solid-state transformer 102 may be 410 Vdc plus the PFC ripple, and the transformer turns ratio may be 4:6. In this example, the output voltage Vdcx_out1 . . . Vdcx_outN for each DCX stage 116 is 307.5 Vdc nominal and SiC or GaN switch devices with 400V blocking capability may be used for both the DCX rectification devices Q5-Q16 and the switch devices 108, 110 of the post-regulator half bridge converter stages 106. Other DCX input voltages and transformer turns ratios may be used to yield a different nominal output voltage Vdcx_out1 . . . Vdcx_outN for each DCX stage 116 of the solid-state transformer 102, and the switch devices Q5-Q16 for the DCX stages 116 and the switch devices 108, 110 for the post-regulator half bridge converter stages 106 may be selected accordingly.

More generally, each post-regulator half bridge converter stage 106 may have a voltage rating Vdc_rated that is a fraction of the maximum output voltage Vdc_max of the power converter and the fraction depends on the number N of post-regulator half bridge converter stages 106 included in the power converter such that Vdc_rated≥Vdc_max/N. In one embodiment, Vdc_max=900 Vdc and N≥3. Separately or in combination, the controller 112 may phase shift the PWM signals A . . . F by $$\frac{360°}{N}$$

for controlling the post-regulator half bridge converter stages 106.

The selection of the number of post-regulator half bridge converter stages 106 is a trade-off between cost, efficiency, and size of the entire system. In general, the efficiency of the post-regulator half bridge converter stages 106 depends mostly on the switching losses of the post-regulator switch devices 108, 110. Accordingly, up to a sensible limit, the higher the number of post-regulator half bridge converter stages 106, the better the efficiency of the half bridge converter stages 106, because of the lower voltage class of the semiconductor devices 108, 110 and the lower input voltage Vdcx_out1 . . . Vdcx_outN to each post-regulator half bridge converter stage 106.

Figure 2:
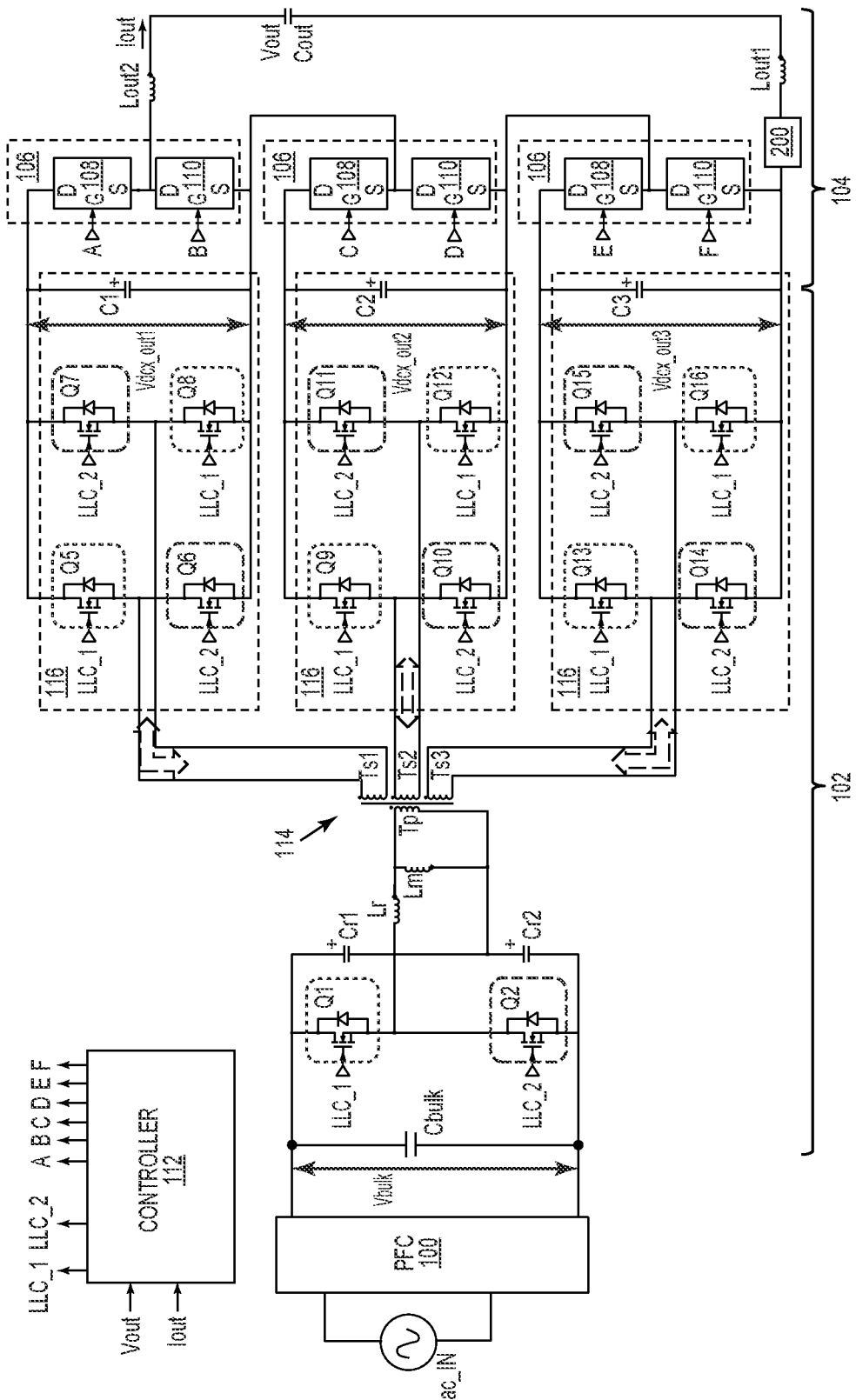
FIG. 2 illustrates another embodiment of the power converter system.

FIG. 2 illustrates another embodiment of the off-line power supply system. The embodiment shown in FIG. 2 is similar to the embodiment shown in FIG. 1. In FIG. 2, the power converter output inductor Lout is implemented as a first winding Lout1 and a second winding Lout2. The first winding Lout1 is connected to the low-side (source/emitter) input of the bottom (lowermost) post-regulator half bridge converter stage 106 in the cascade configuration. The second winding Lout2 is connected to the switched node/phase output SW1 of the top (uppermost) post-regulator half bridge converter stage 106 in the cascade configuration. Also, the primary side of the solid-state transformer 102 includes a half-bridge resonant converter formed by switch devices Q1 and Q2 and two corresponding resonant capacitors Cr1, Cr2 instead of the full-bridge resonant converter in FIG. 1 which is formed by switch devices Q1 through Q4 and a single resonant capacitor Cr. The power converter may include a current sensor 200 such as a resistive shunt connected to the bottom (lowermost) post-regulator half bridge converter stage 106 in the cascade configuration and referenced to ground of the controller 112.

Figure 3:
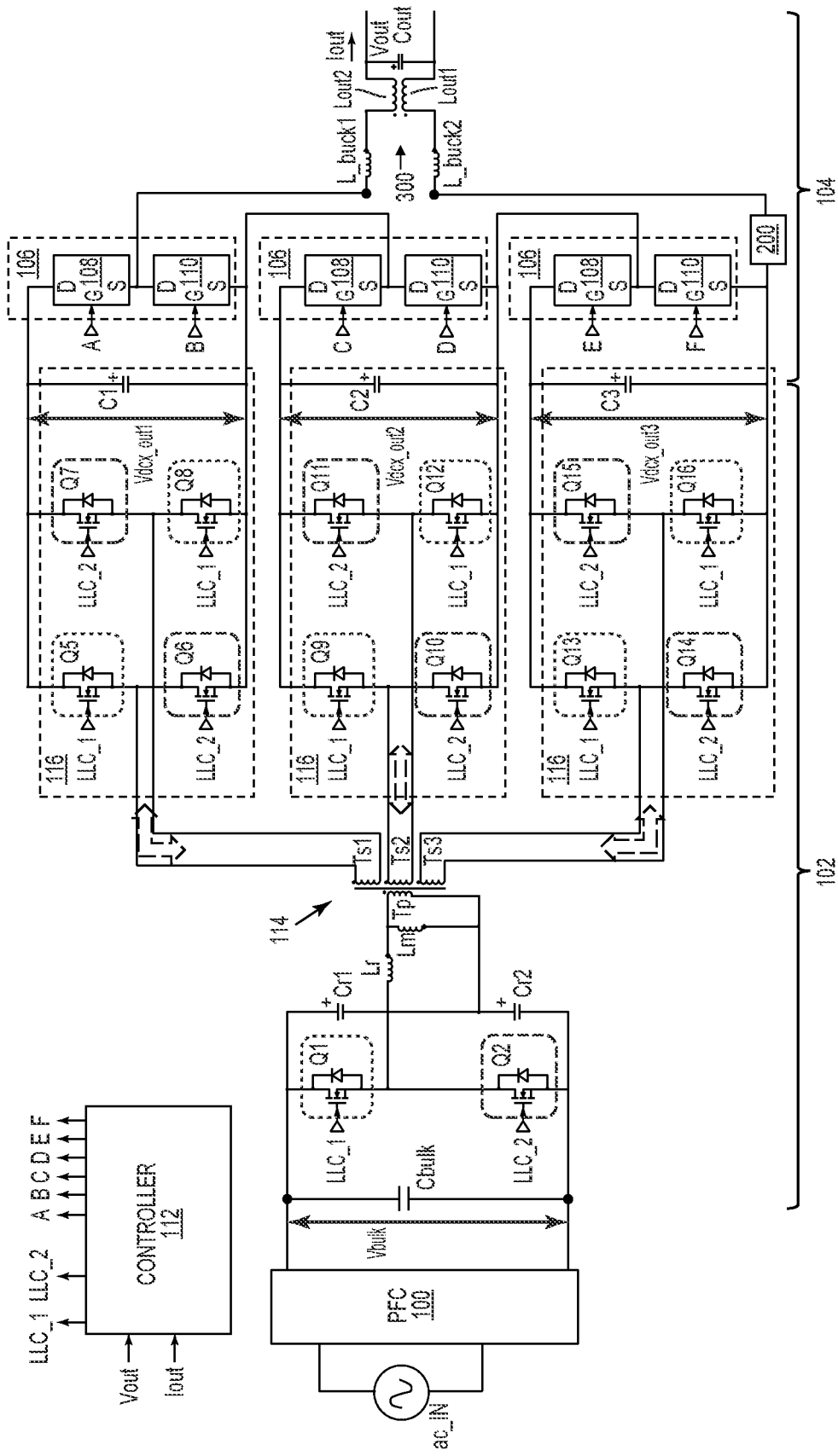
FIG. 3 illustrates another embodiment of the power converter system.

FIG. 3 illustrates another embodiment of the off-line power supply system. The embodiment shown in FIG. 3 is similar to the embodiment shown in FIG. 2. In FIG. 3, the output inductor Lout is implemented as a common mode inductor with the first winding Lout1 and the second winding Lout2 wound on a single core 300. The common mode inductor opposes the common mode voltage, therefore filtering the differential mode ripple seen at the output inductors L_buck1, L_buck2 of the buck converter and filtering the common mode noise.

Described next is an embodiment of a modulation scheme employed by the controller 112 during operation of the power converter shown in FIG. 3.

The modulation embodiment is described next with reference to the three (3) post-regulator half bridge converter stages 106 shown in FIG. 3 but may be generalized as follows. For the three (3) post-regulator half bridge converter stage example, the controller 112 implements a phase shifted duty cycle for the post-regulator half bridge converter stages 106 that is less than 1/N such that voltage levels applied to the output inductor Lout range between zero and Vdcx_out where Vdcx_out is the output voltage of the individual DCX stages 116 of the solid-state transformer 102 and N is the number of post-regulator half bridge converter stages 106 included in the power converter. More generally, the controller 112 may fix the phase-shift to 360/N degrees. A duty less than 1/N yields 0<Vout<Vdcx_out, 1/N<duty<2/N yields Vdcx_out<Vout<2*Vdcx_out, . . . , (N−1)/N<duty<1 yields (N−1)*Vdcx_out<Vout<N*Vdcx_out.

The DCX stages 116 on the secondary side of the solid-state transformer 102 operate at a fixed frequency, e.g., in close proximity to the natural frequency of the LLC series resonant tank and at fixed percent duty, e.g., 50%. The solid-state transformer 102 provides a large signal gain ratio given by the transformer turn ratio and by the realization of the primary side converter and the secondary side rectification configuration.

In FIG. 3, the primary side of the solid-state transformer 102 utilizes a half-bridge resonant converter formed by switch devices Q1 and Q2. By using a half-bridge resonant converter on the primary side of the solid-state transformer 102, the LLC resonant tank applies half of the input voltage Vbulk to the transformer 114 which provides a gain of one half. If the primary side of the solid-state transformer 102 instead utilized a full-bridge resonant converter as shown in FIG. 1, the gain could be one or one-half depending on the applied modulation.

In FIG. 3, the secondary side of the solid-state transformer 102 has three (3) separate full bridge rectifiers (Q5-Q8, Q9-Q12, and Q13-Q16) that provide unity gain. However, other arrangements may be used, e.g., a voltage doubler for a multiplication factor.

In the example illustrated in FIG. 3, the transformer turns ratio equals to four primary turns to six secondary turns, therefore giving a total gain of the solid-state transformer 102 in a range of:

$$G_{DCX} \approx \frac{n_p}{2 \cdot n_s} = \frac{4}{2 \cdot 6} = \frac{1}{3} \quad (1)$$

Therefore, the input of each post-regulator half bridge converter stages 106 is:

$$V_{dcx\_out} \approx \frac{V_{bulk}}{3} \quad (2)$$

The factor of 3 in equations (1) and (2) is a consequence of the turns ratio selection example give above and is not directly related to the number of post-regulator half bridge converter stages 106, which happens to be three in this example.

The post-regulator half bridge converter stages 106 may operate at a fixed frequency and with equal duty cycle. However, the respective PWM gate signals A through F generated by the controller 112 for the gates of the individual half-bridge switch devices 108, 110 are shifted in relation to each other, based on the number of post-regulator half bridge converter stages 106, resulting in interleaving and frequency multiplication over the output inductor Lout. With this approach, the volume and core loss of the magnetic component for the output inductor Lout is reduced. The phase shift can be calculated by:

$$\varphi_{BUCK,(n+1)} - \varphi_{BUCK,(n)} = \frac{360°}{n_{stages}} \quad (3)$$

Depending on the duty applied to the post-regulator half bridge converter stages 106, an effective duty is obtained over the output inductor Lout between two different levels which depend on the overlap between the gate signals A through F of each single post-regulator half bridge converter stage 106. For the three (3) post-regulator half bridge converter stage example shown in FIG. 3, the controller 112 has three different operation modes.

Figure 4A:
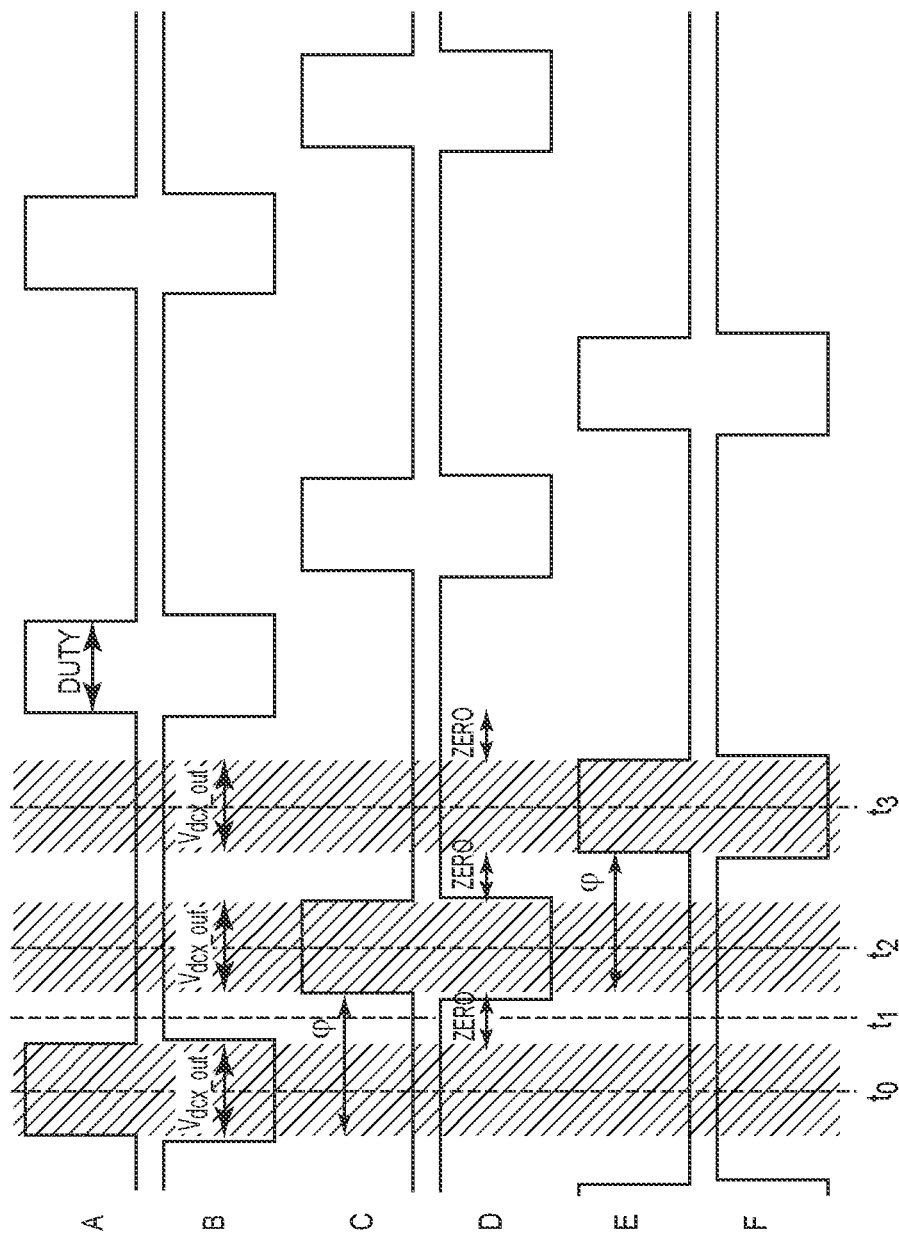
FIG. 4A illustrates gate signals generated by a controller of the power converter system in a first mode of operation, for a 3-stage post-regulator half bridge converter stage example.

FIG. 4A illustrates the gate signals A through F generated by the controller 112 for the switch devices 108, 110 of the post-regulator half bridge converter stages 106 in the first mode of operation, for the 3-stage post-regulator half bridge converter stage example. FIGS. 4B through 4E illustrate different states of the power converter in the first operation mode. FIG. 4F illustrates the output inductor current iL, the output voltage Vout of the power converter, and the output inductor voltage V_Lout as a function of the gate signals A through F applied to the gates of the post-regulator half bridge converter switch devices 108, 110 in the first mode of operation.

In the first mode of operation, the buck converter duty is less than one third, the effective duty over the output inductor duty$_{Lout}$ is equal to:

$$duty_{Lout} = duty = Vout/Vdcx\_out \quad (4)$$

and the voltage levels applied to the output inductor Lout range between Vdcx_out and zero where Vdcx_out is the output voltage of the individual DCX stages 116. Accordingly, the effective duty$_{Lout}$ over the output inductor Lout is equal to the duty of the individual post-regulator half bridge converter stages 106, as shown in FIG. 4A. The phase shift between the PWM signals of each consecutive post-regulator half bridge converter stage 106 is equal to 360°/N(φ) in all the modes, where N(φ) is the number of post-regulator half bridge converter stages 106.

Figure 4B:
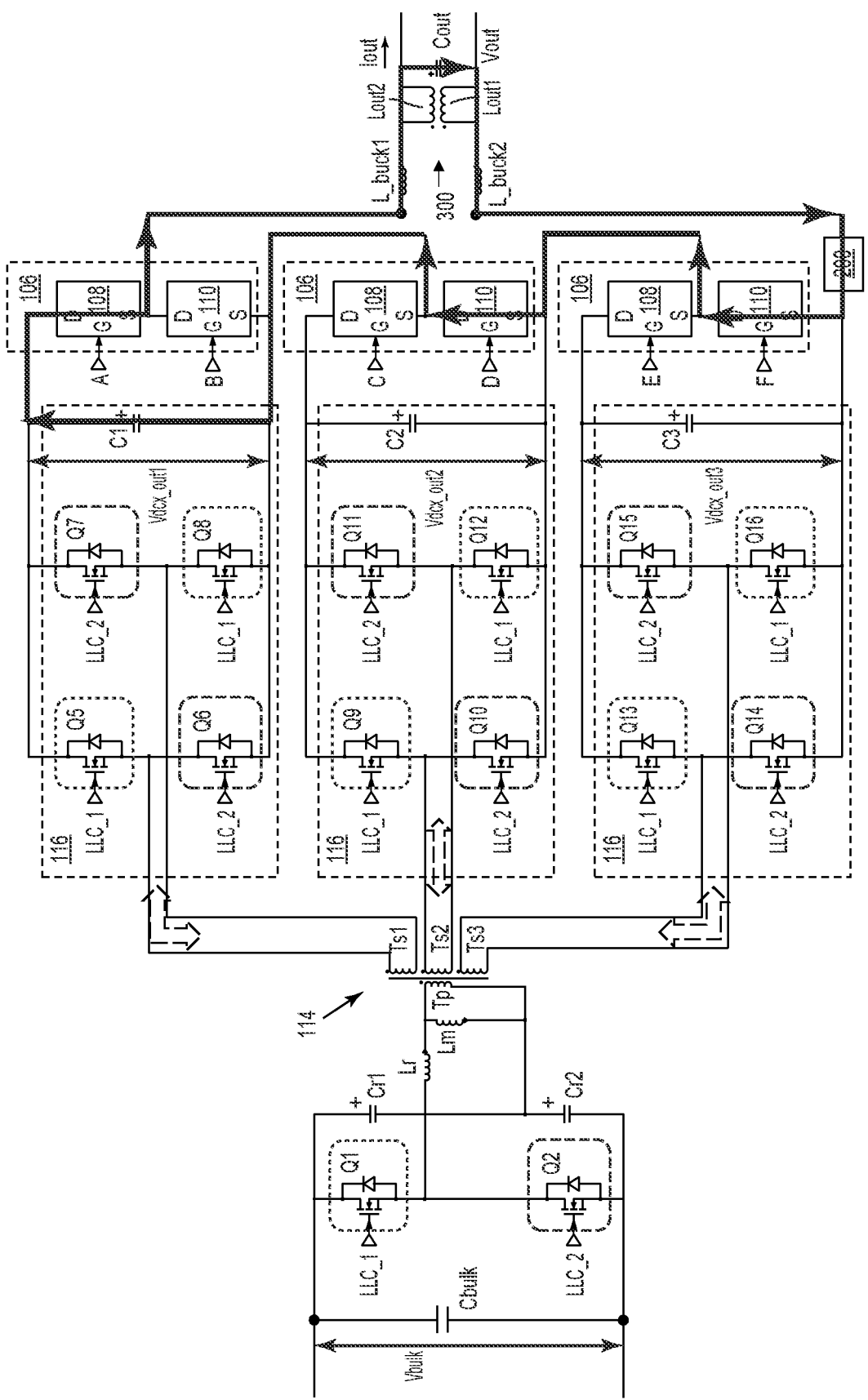
FIGS. 4B through 4E illustrate different states of the power converter in the first operation mode.

In state [t₀] in FIG. 4A, the high side switch device 108 of the top (uppermost) post-regulator half bridge converter stage 106 in the cascade configuration is on while the high side switch device 108 of the bottom two (2) post-regulator half bridge converter stages 106 in the cascade configuration are off as shown in FIG. 4B. In this state, the voltage V_Lout applied to the input of the power converter output filter Lout, Cout is equal to Vdcx_out where Vdcx_out is the output voltage of the individual DCX stages 116.

Figure 4C:
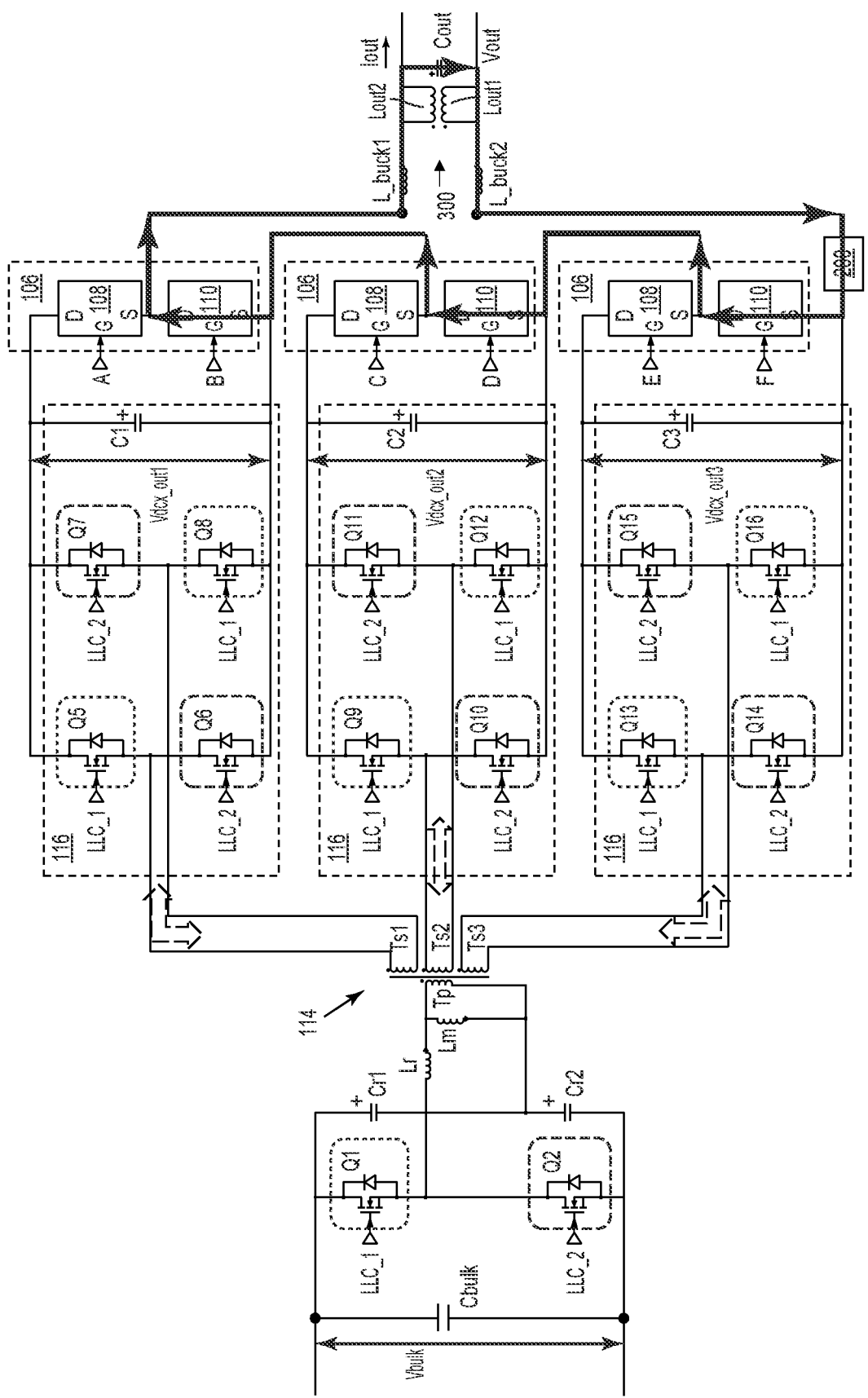

In state [t₁] in FIG. 4A, all the low-side switch devices 110 of all cascaded post-regulator half bridge converter stages 106 are on as shown in FIG. 4C. In this state, zero volts is applied to the power converter output filter Lout, Cout.

Figure 4D:
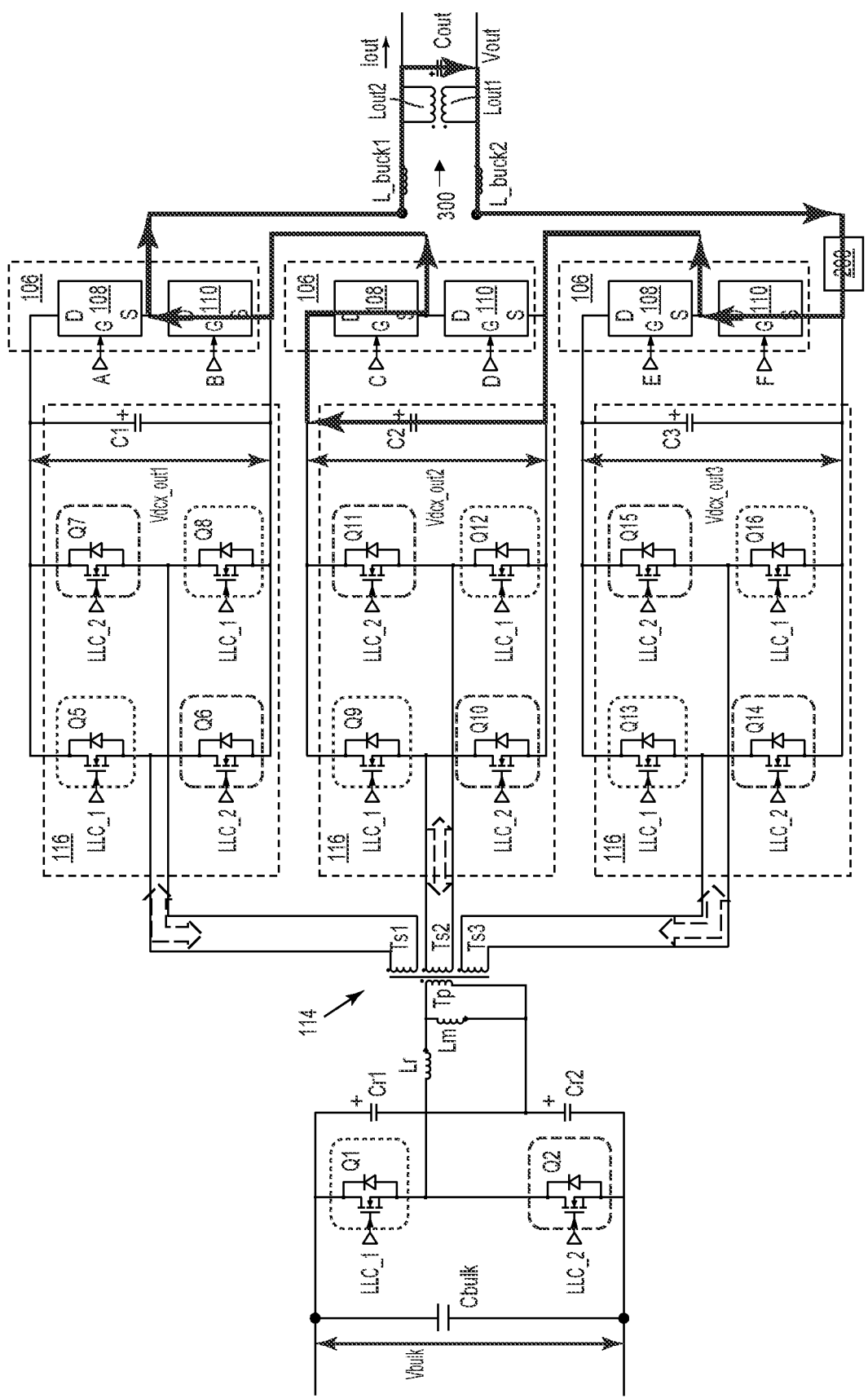
Figure 4E:
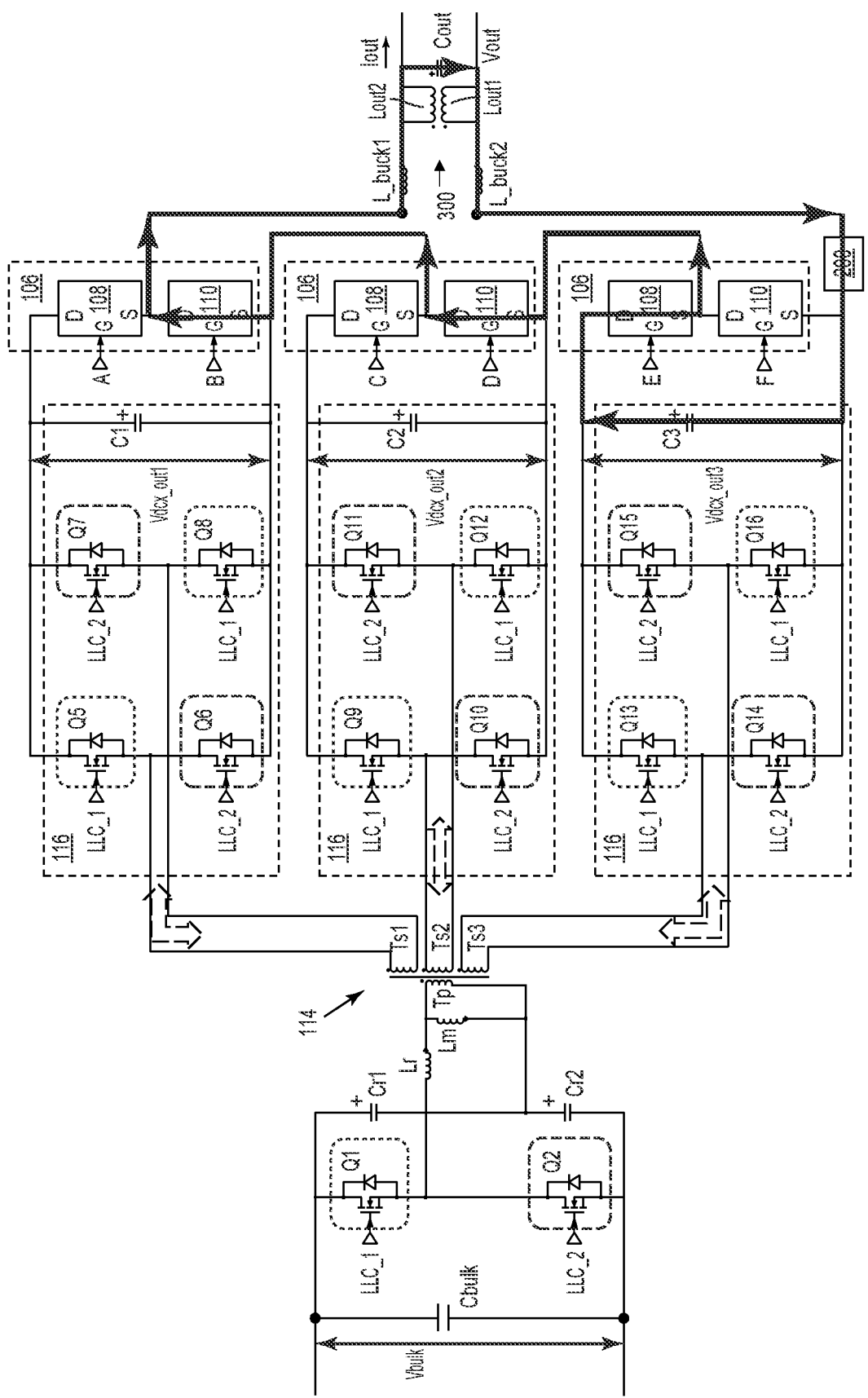
Figure 4F:
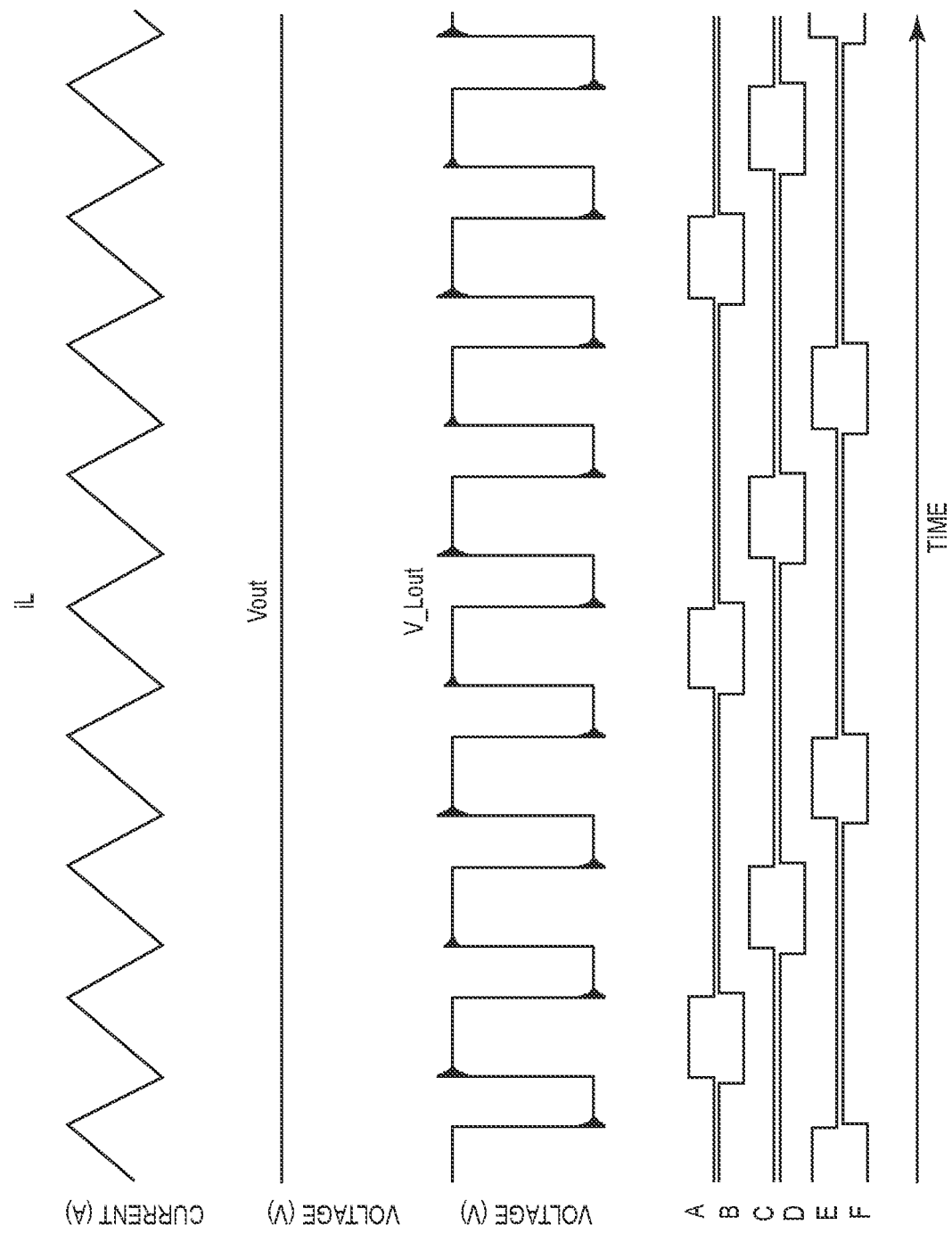
FIG. 4F illustrates the output inductor current, the output voltage of the power converter, and the output inductor voltage as a function of the gate signals in the first mode of operation.

In states [t₂] and [t₃] in FIG. 4A, only one high side switch device 108 of a single post-regulator half bridge converter stage 106 is active at a time as shown in FIGS. 4D and 4E. In these states, Vdcx_out is applied in an interleaved fashion, and therefore, the post-regulator half bridge converter stages 106 share power delivery to the output of the full system.

Figure 5A:
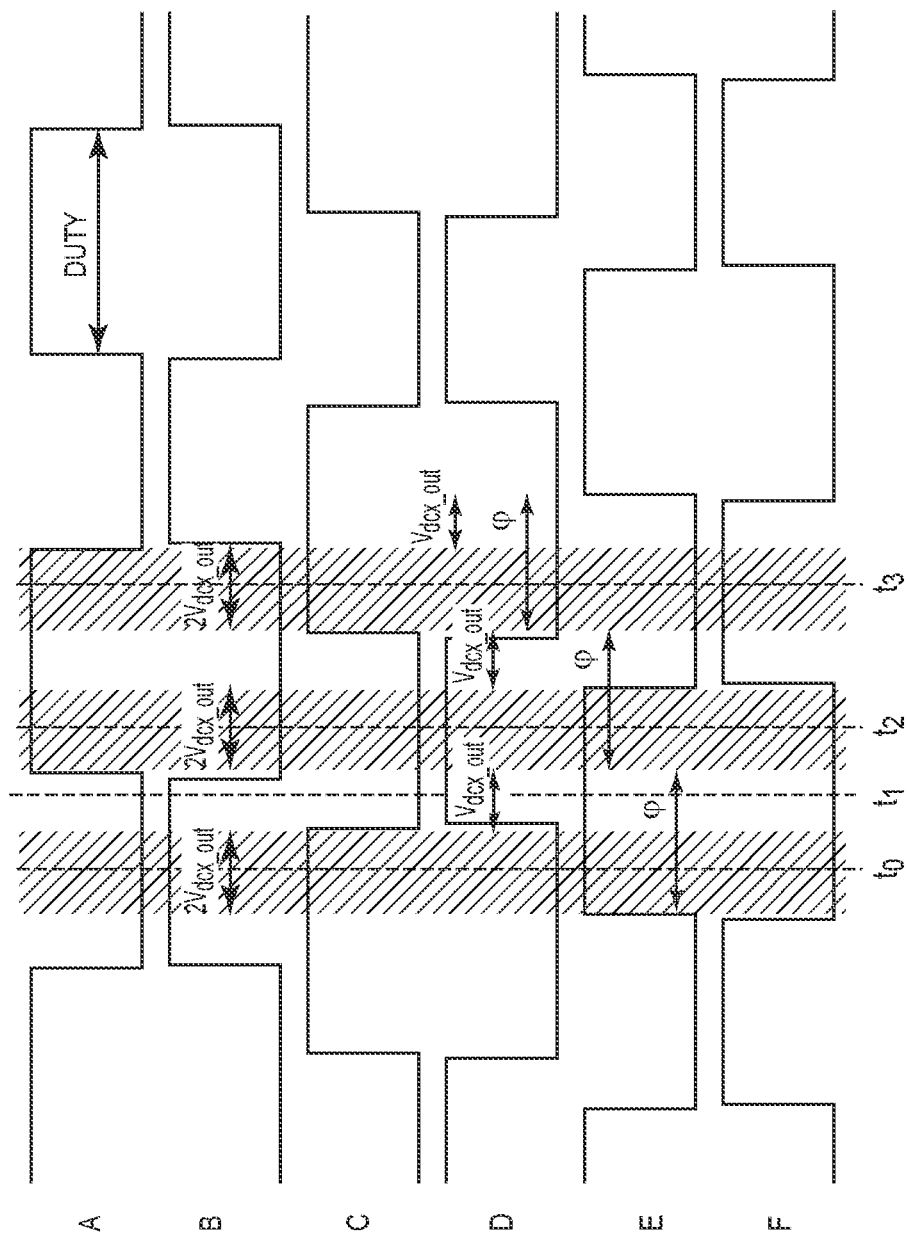
FIG. 5A illustrates gate signals generated by a controller of the power converter system in a second mode of operation, for the 3-stage post-regulator half bridge converter stage example.

FIG. 5A illustrates the gate signals A through F generated by the controller 112 for the switch devices 108, 110 of the post-regulator half bridge converter stages 106 in the second mode of operation, for the 3-stage post-regulation half bridge converter stage example. FIGS. 5B through 5G illustrate the state of the power converter during different stages of the second operation mode. FIG. 5H illustrates the output inductor current iL, the output voltage Vout of the power converter, and the output inductor voltage V_Lout as a function of the gate signals A through F applied to the gates of the half bridge converter switch devices 108, 110 in the second mode of operation.

In the second mode of operation for the 3-stage post-regulation half bridge converter stage example, the modulation implemented by the controller 112 alternates between on-state overlap for the high-side switch devices 108 in two of the post-regulator half bridge converter stages 106 (alternating which ones), and only one high-side switch device 108 being on for one of the post-regulator half bridge converter stages 106 (also alternating which one). Accordingly, the buck converter duty is more than one third and less than two thirds, the effective duty $\text{duty}_{Lout}$ over the output inductor Lout is equal to the overlap of two of the half bridge converter high-side switch devices 108 as given by:

$$\text{duty}_{Lout} = \frac{V_{out} - 1 \cdot V_{dcx\_out}}{V_{dcx\_out}} \quad (5)$$

and the voltages applied to the output inductor Lout vary between two times Vdcx_out and one times Vdcx_out where Vdcx_out is the output voltage of the individual DCX stages 116, where $0 < \text{duty}_{Lout} < 1$.

Figure 5B:
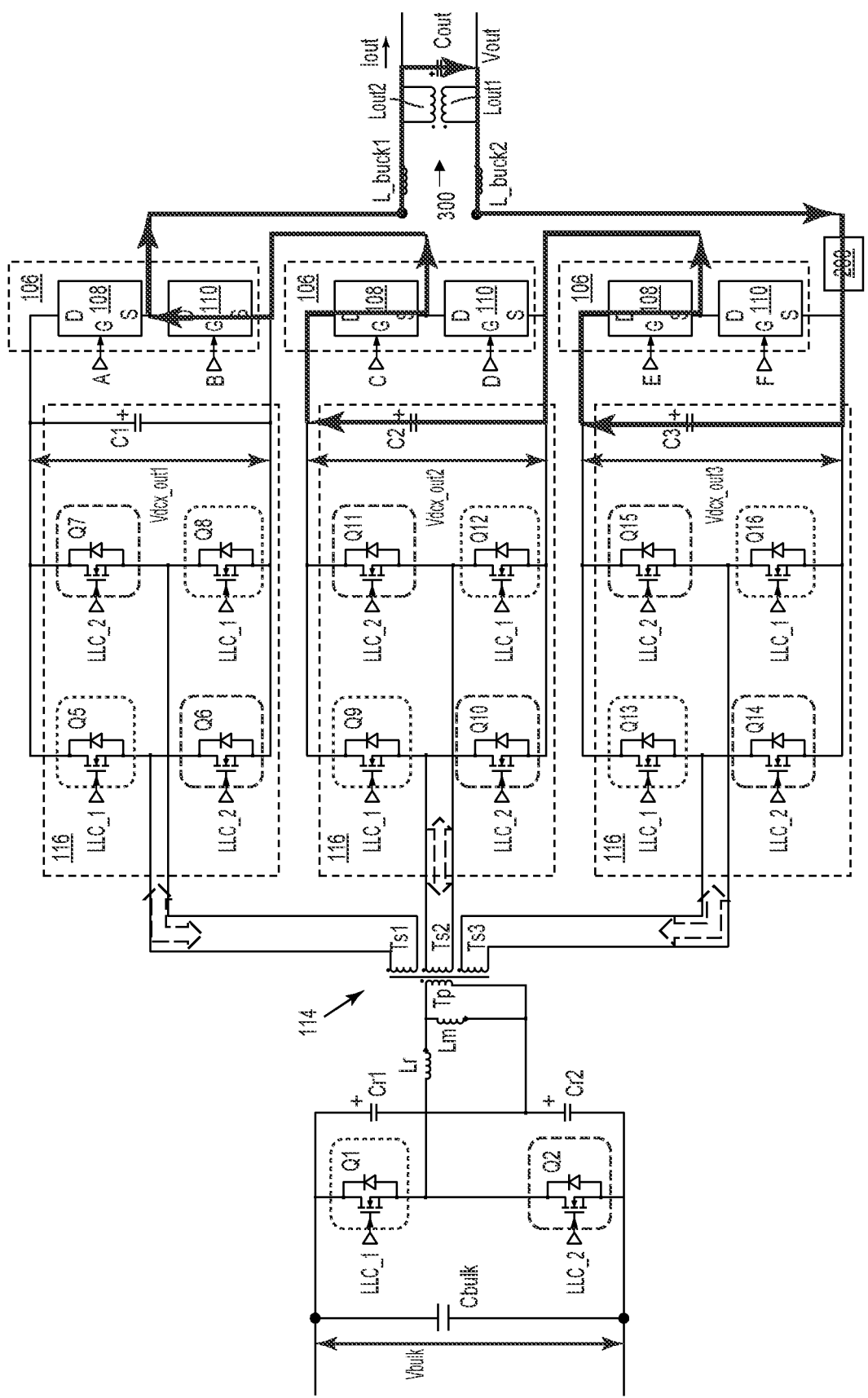
FIGS. 5B through 5G illustrate different states of the power converter in the second operation mode.

In state [t₀] in FIG. 5A, the high-side switch device 108 of the two lower post-regulator half bridge converter stages 106 are on as shown in FIG. 5B. In this state, 2·Vdcx_out is applied to the output filter Lout, Cout of the power converter.

Figure 5C:
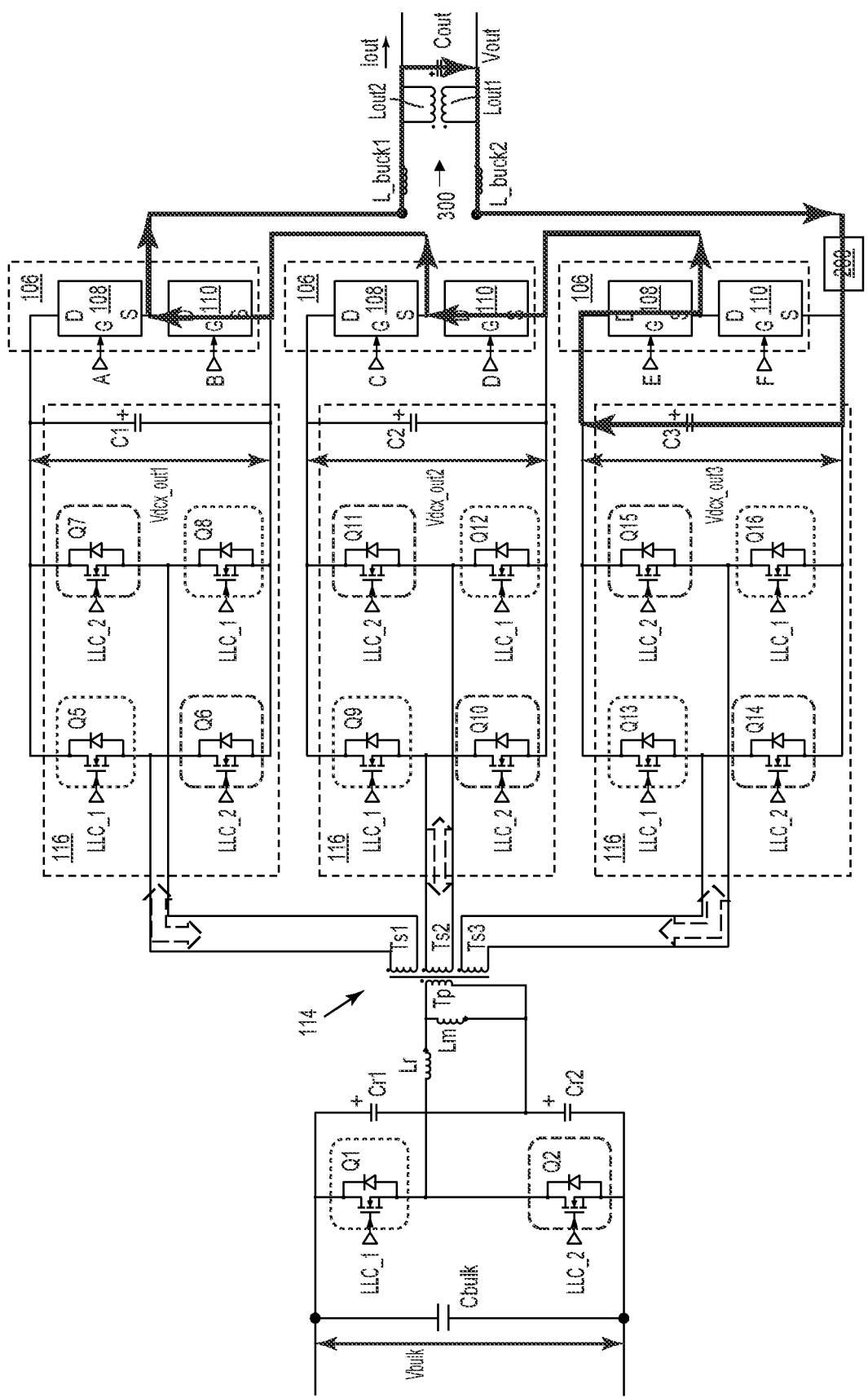
Figure 5D:
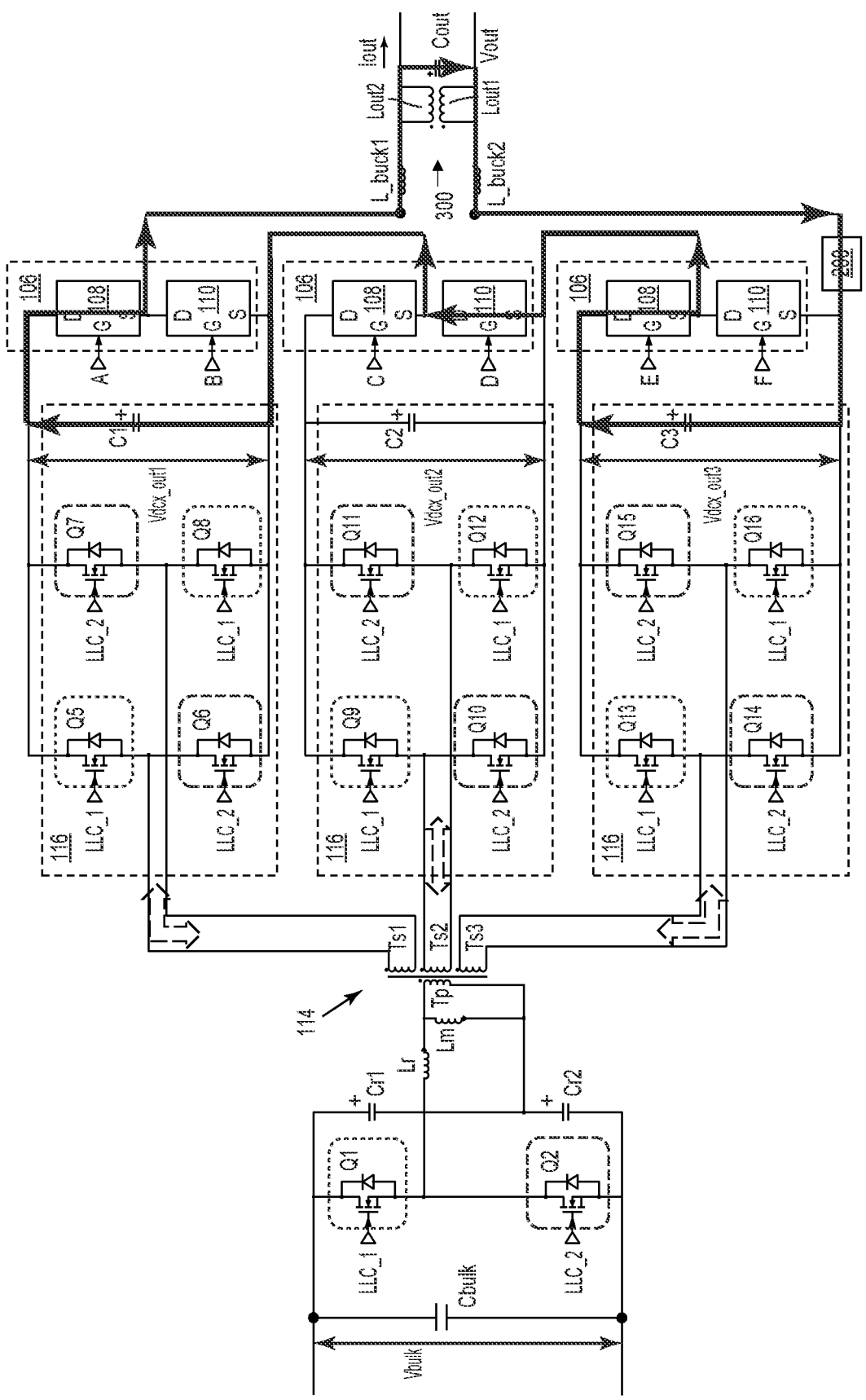
Figure 5E:
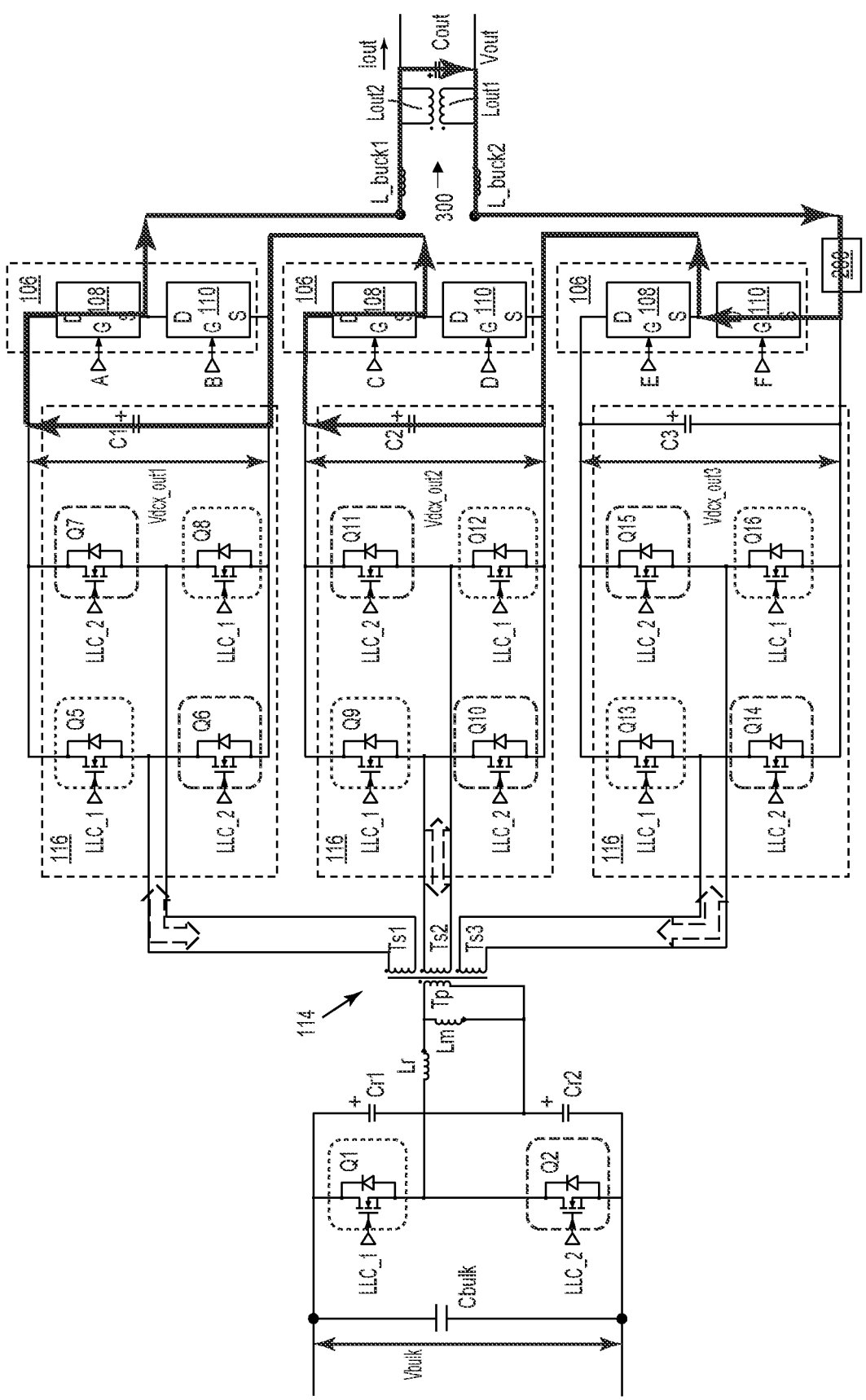
Figure 5F:
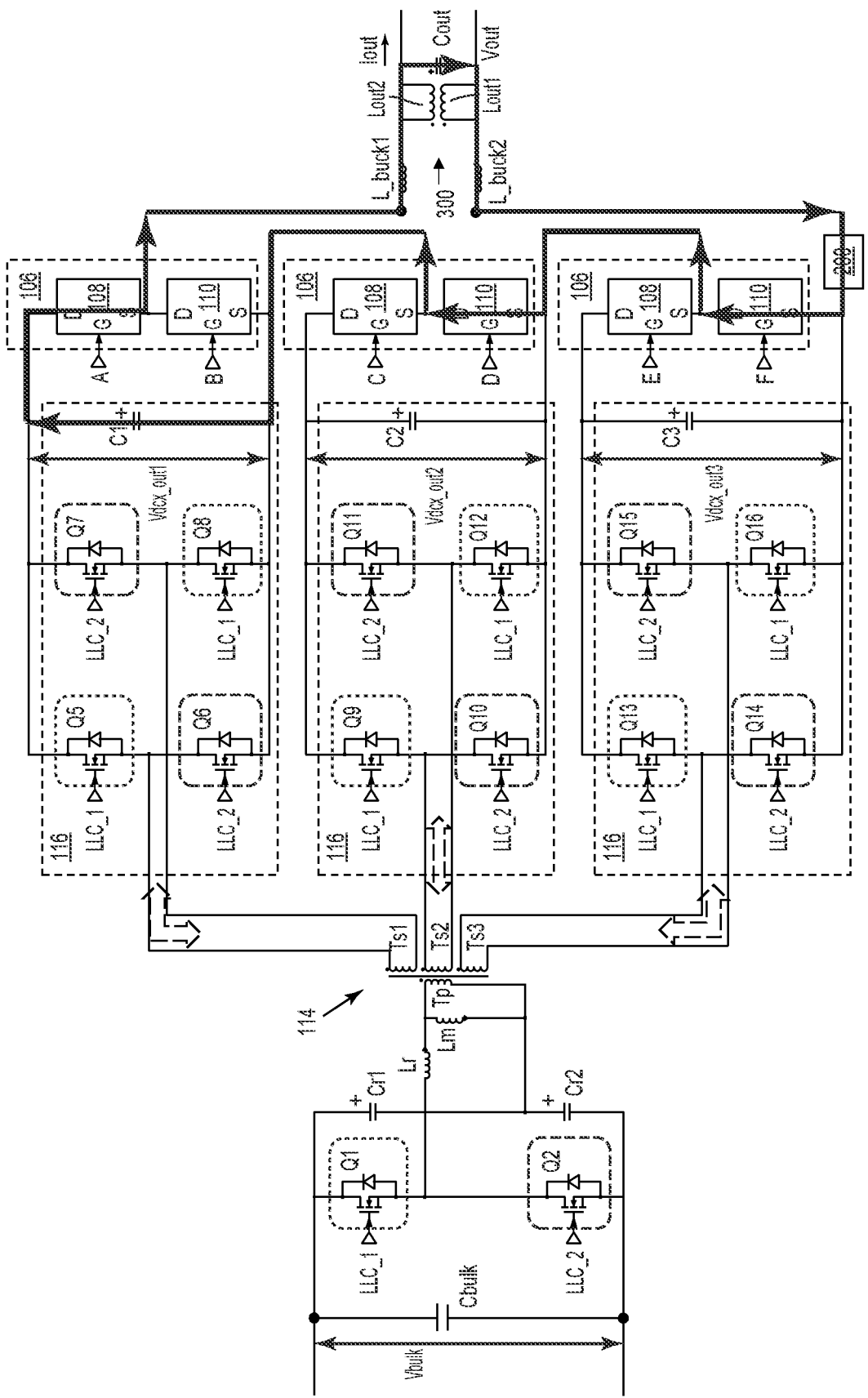
Figure 5G:
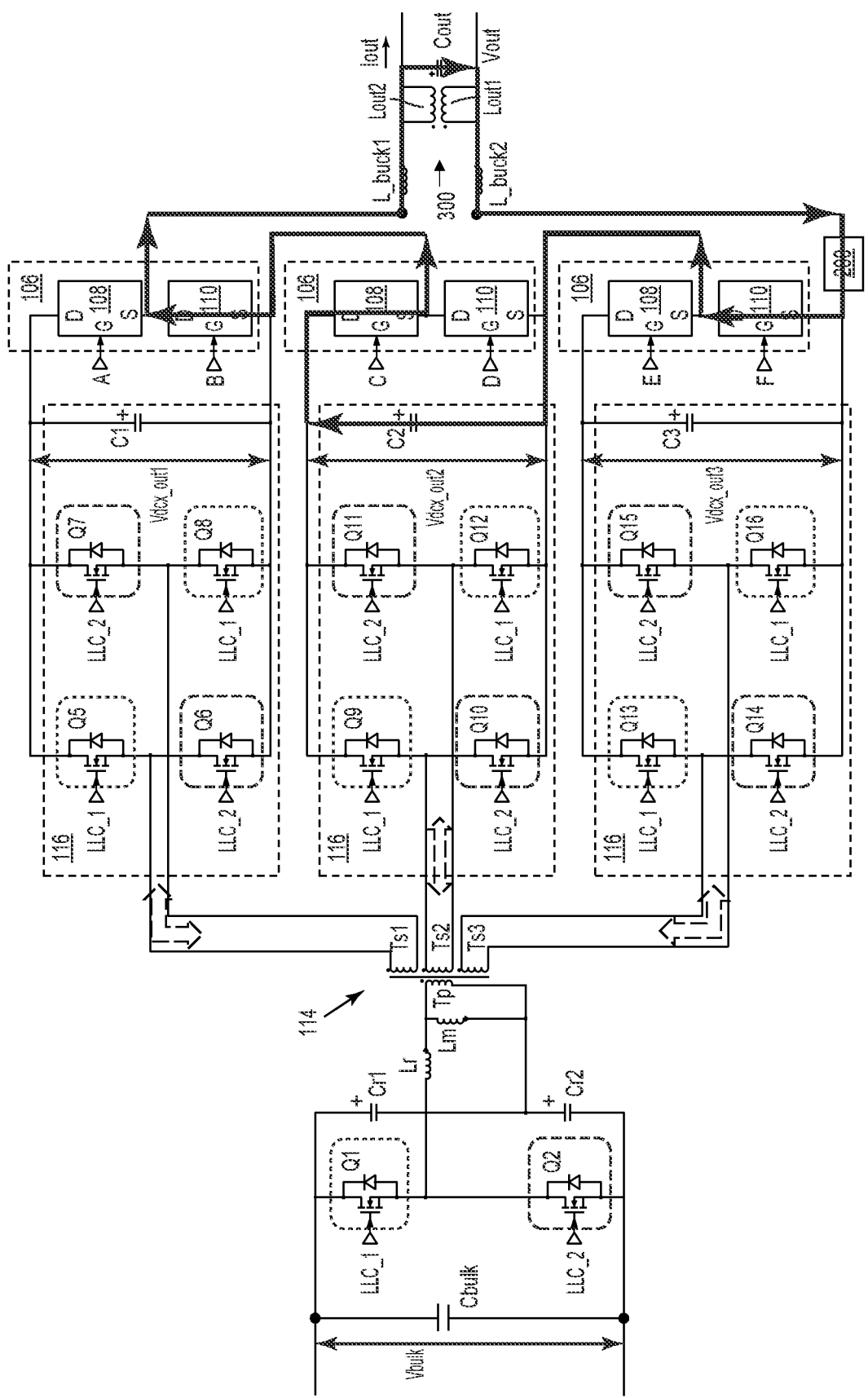
Figure 5H:
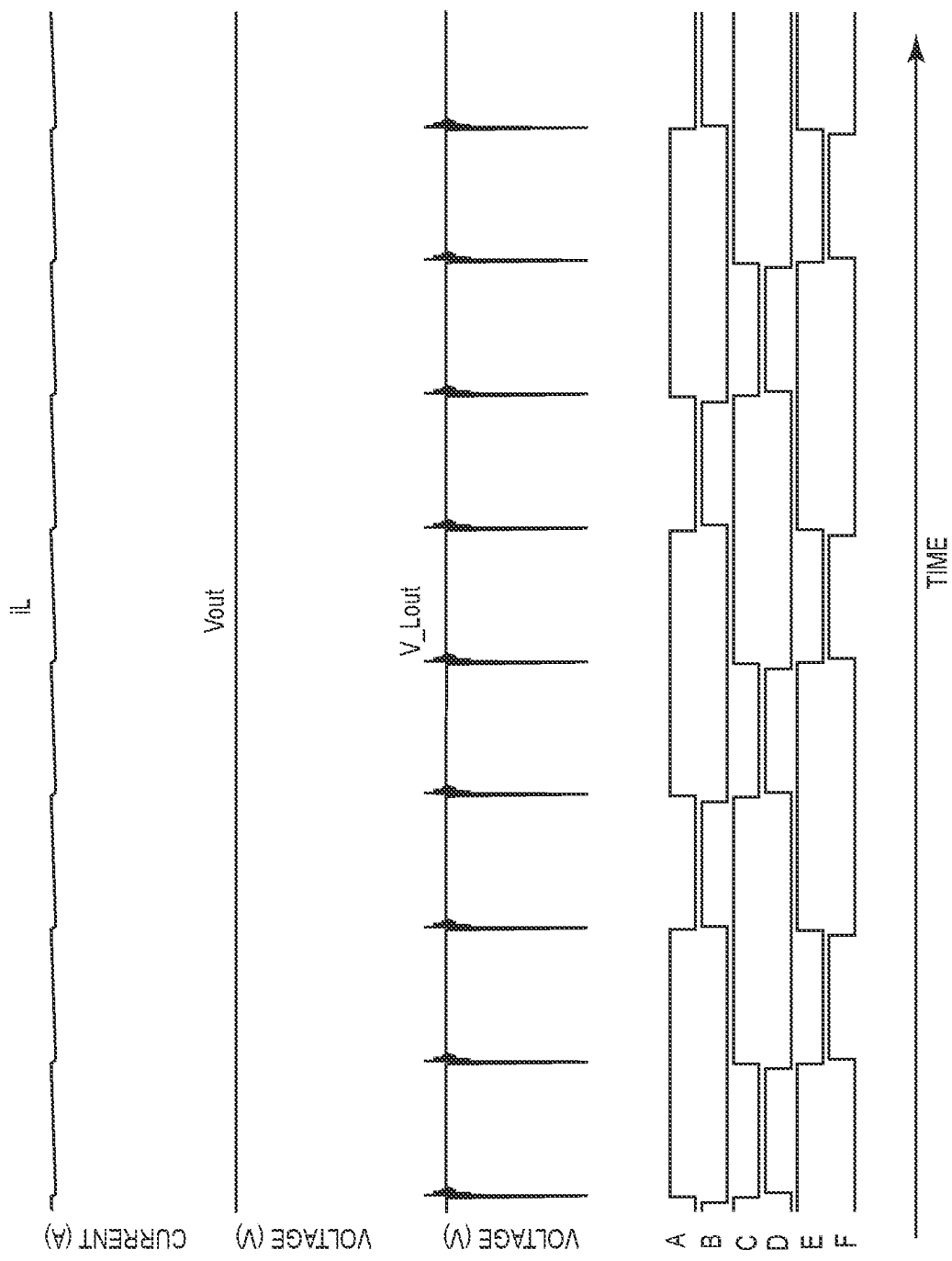
FIG. 5H illustrates the output inductor current, the output voltage of the power converter, and the output inductor voltage as a function of the gate signals in the second mode of operation.

In state [t₁] in FIG. 5A, only the high-side switch device 108 of the bottom (lowermost) post-regulator half bridge converter stage 106 in the cascade configuration is on as shown in FIG. 5C. In this state, Vdcx_out is applied to the output filter Lout, Cout of the power converter.

In states [t₂] and [t₃] in FIG. 5A, two of the post-regulator high-side switch devices 108 are on but in alternative combinations compared to state [to] and as shown in FIGS. 5D through 5G. In these states, 2·Vdcx_out is applied to the output filter Lout, Cout of the power converter.

Generalizing the second mode of operation for N post-regulator half bridge converter stages 106, the controller 112 may implement a phase shifted duty cycle for the post-regulator half bridge converter stages 106 that is in a range of 1/N to 2/N such that voltage levels applied to the output inductor Lout range between Vdcx_out and 2*Vdcx_out, where Vdcx_out is the voltage of the isolated DC outputs of the solid-state transformer 102 and N is the number of post-regulator half bridge converter stages 106 included in the power converter.

Figure 6A:
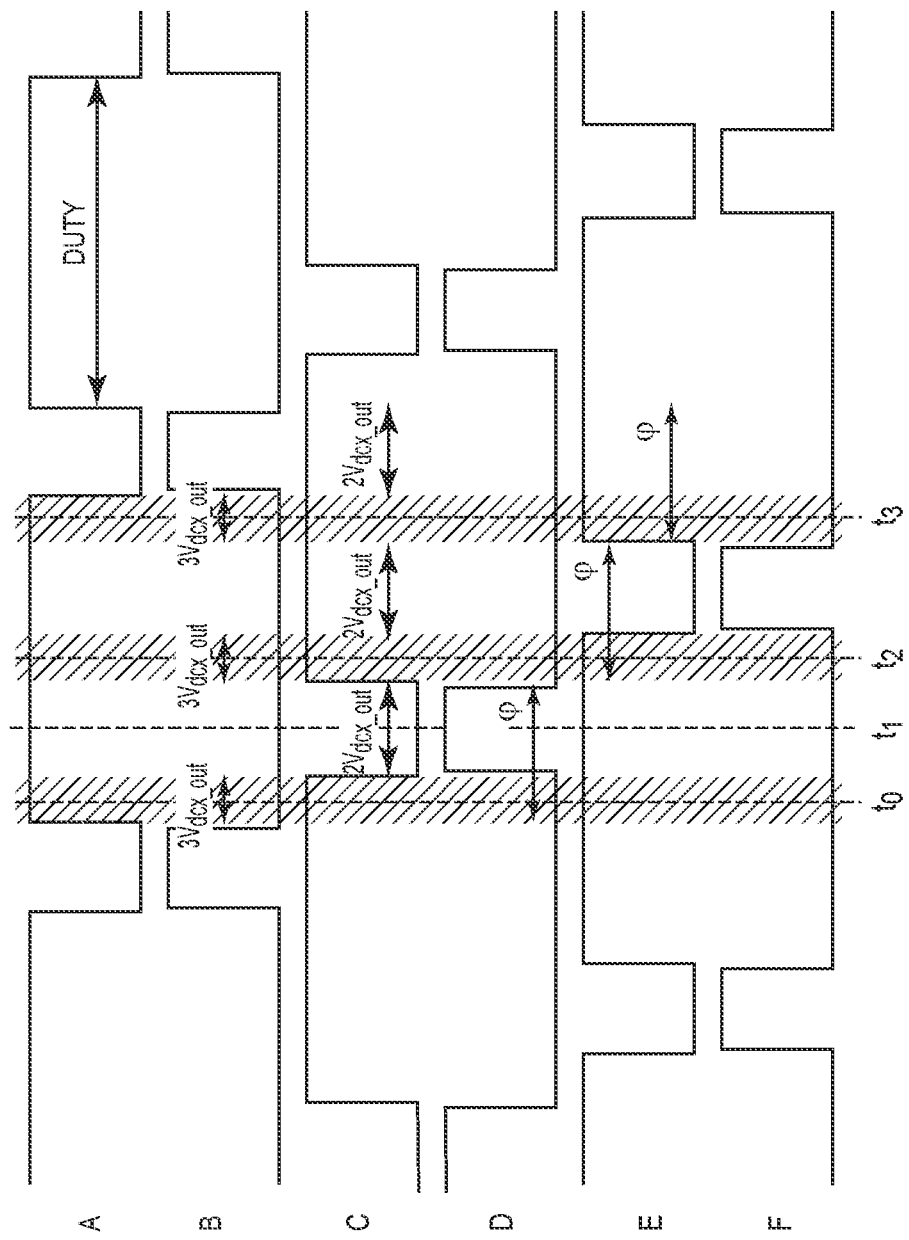
FIG. 6A illustrates gate signals generated by a controller of the power converter system in a third mode of operation, for the 3-stage post-regulator half bridge converter stage example.

FIG. 6A illustrates the gate signals A through F generated by the controller 112 for the switch devices 108, 110 of the post-regulation half bridge converter stages 106 in the third mode of operation, for the 3-stage post-regulation half bridge converter stage example. FIGS. 6B through 6E illustrate the state of the power converter during different stages of the third operation mode. FIG. 6F illustrates the output inductor current iL, the output voltage Vout of the power converter, and the output inductor voltage V_Lout as a function of the gate signals A through F applied to the gates of the half bridge converter switch devices 108, 110 in the third mode of operation.

In the third mode of operation for the 3-stage post-regulation half bridge converter stage example, the modulation implemented by the controller 112 alternates between all three high-side devices 108 of the post-regulator half bridge converter stages 106 being on at the same time, and the high-side devices 108 for two of the post-regulator half bridge converter stages 106 being on at the same time. Accordingly, the effective duty over the output inductor Lout is equal to the overlap of the three post-regulator high-side switch devices 108 as given by:

$$\text{duty}_{Lout} = \frac{V_{out} - 2 \cdot V_{dcx\_out}}{V_{dcx\_out}} \quad (6)$$

and the voltage applied to the output filter Lout, Cout of the power converter alternates between 3·Vdcx_out and 2·Vdcx_out.

Figure 6B:
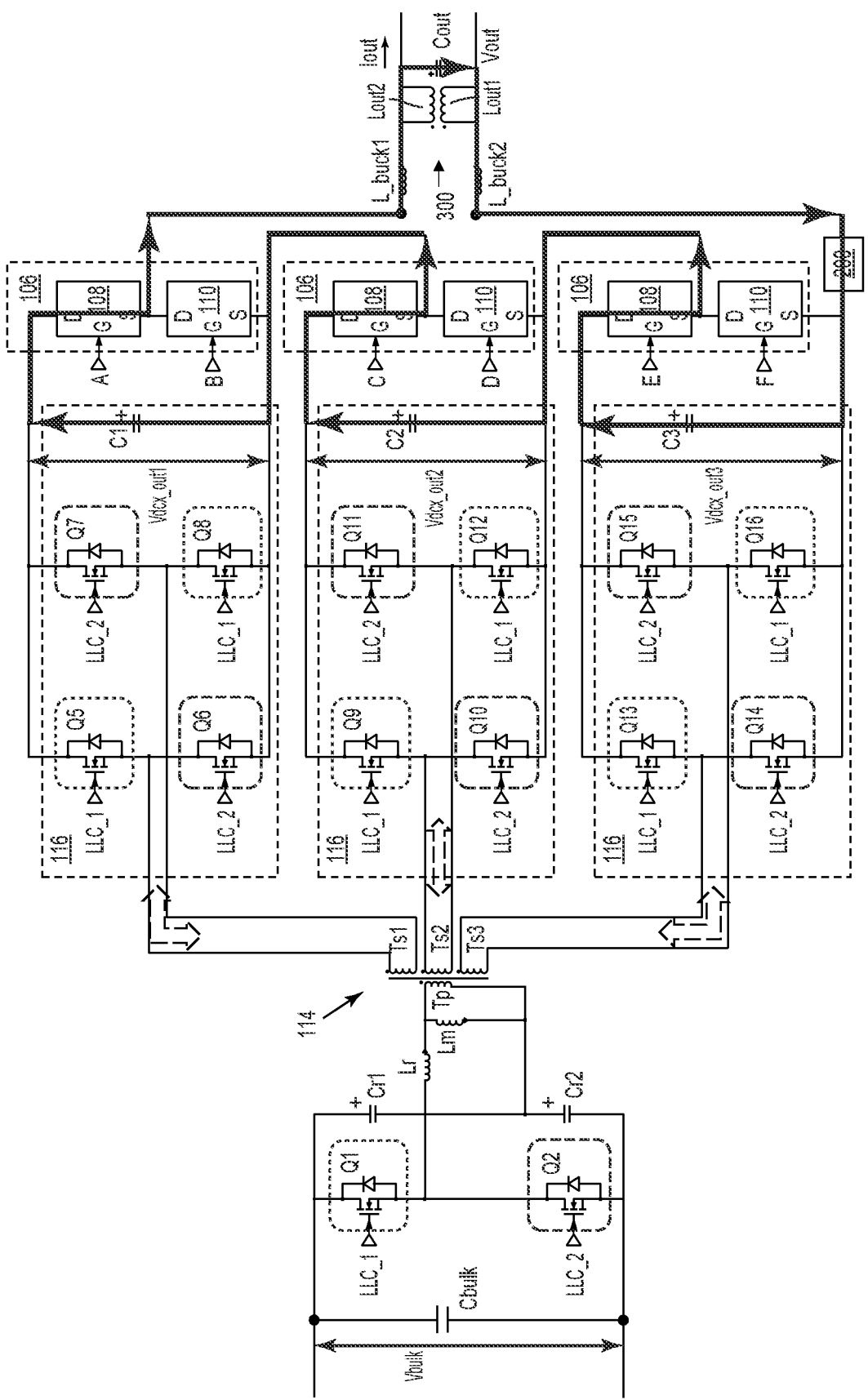
FIGS. 6B through 6E illustrate different states of the power converter in the third operation mode.

In states [to], [t₂] and [t₃] in FIG. 6A, the high-side switch devices 108 of all three post-regulator half bridge converter stages 106 are on as shown in FIG. 6B. In these states, 3·Vdcx_out is applied to the output filter Lout, Cout of the power converter.

Figure 6C:
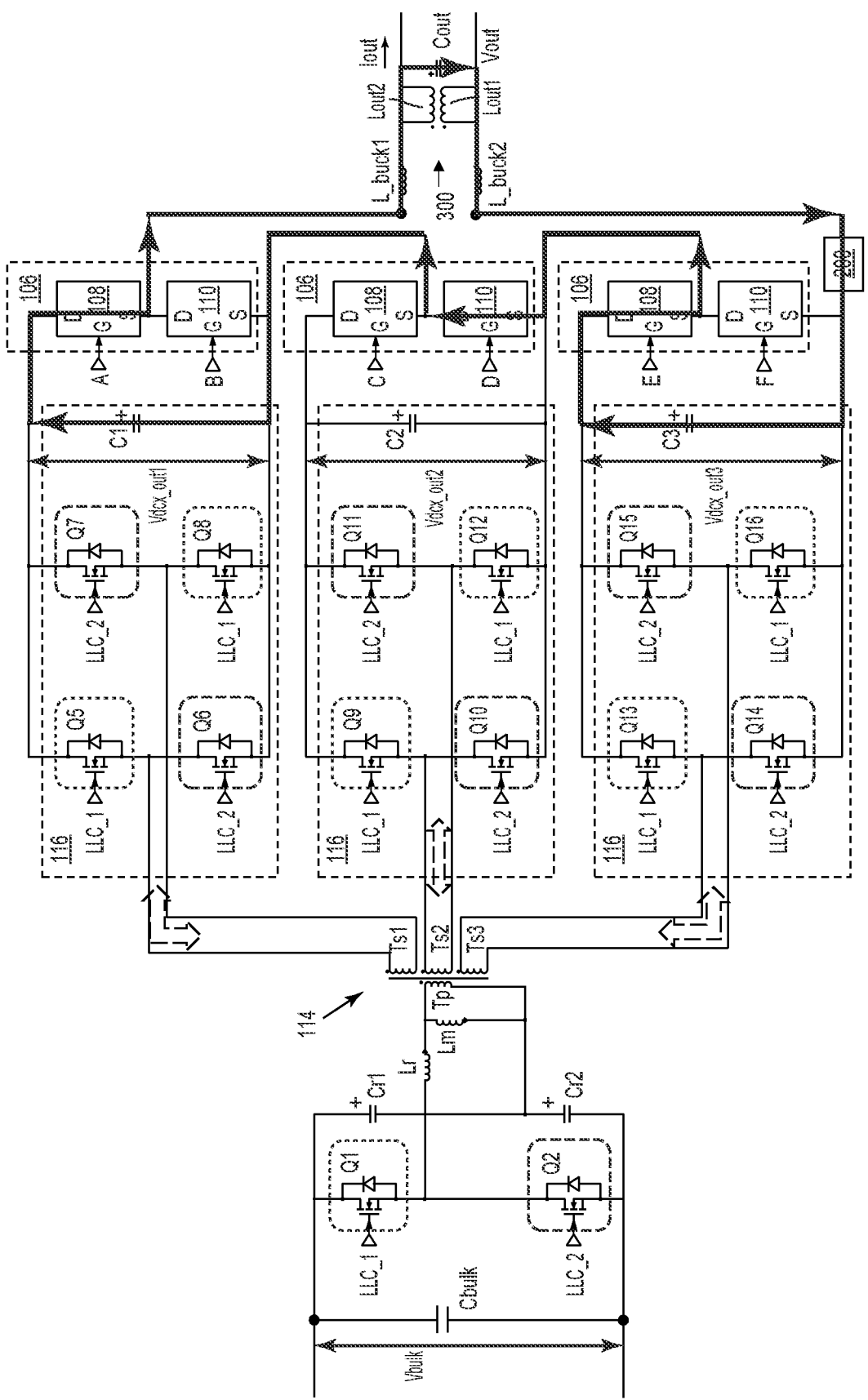
Figure 6D:
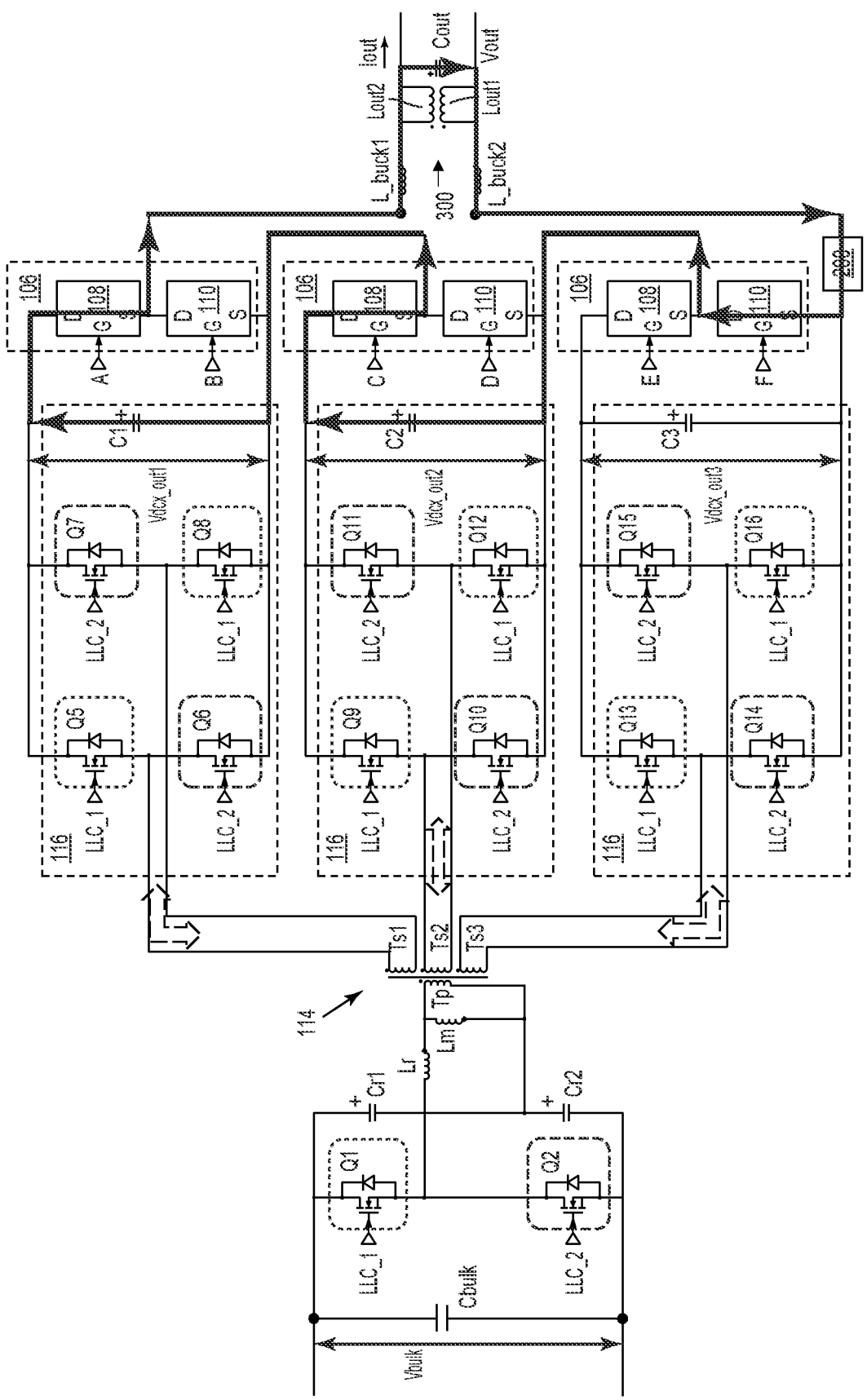
Figure 6E:
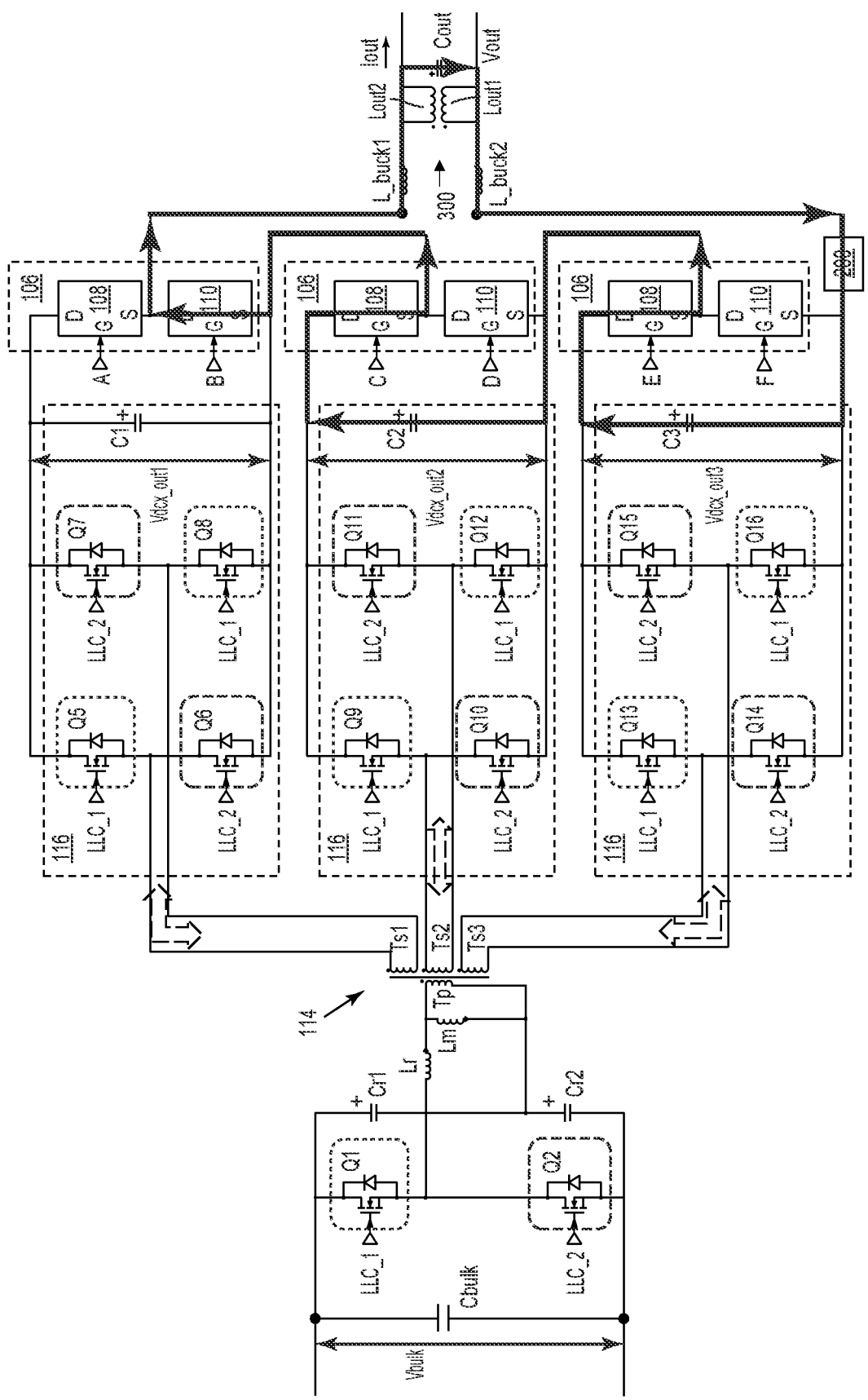
Figure 6F:
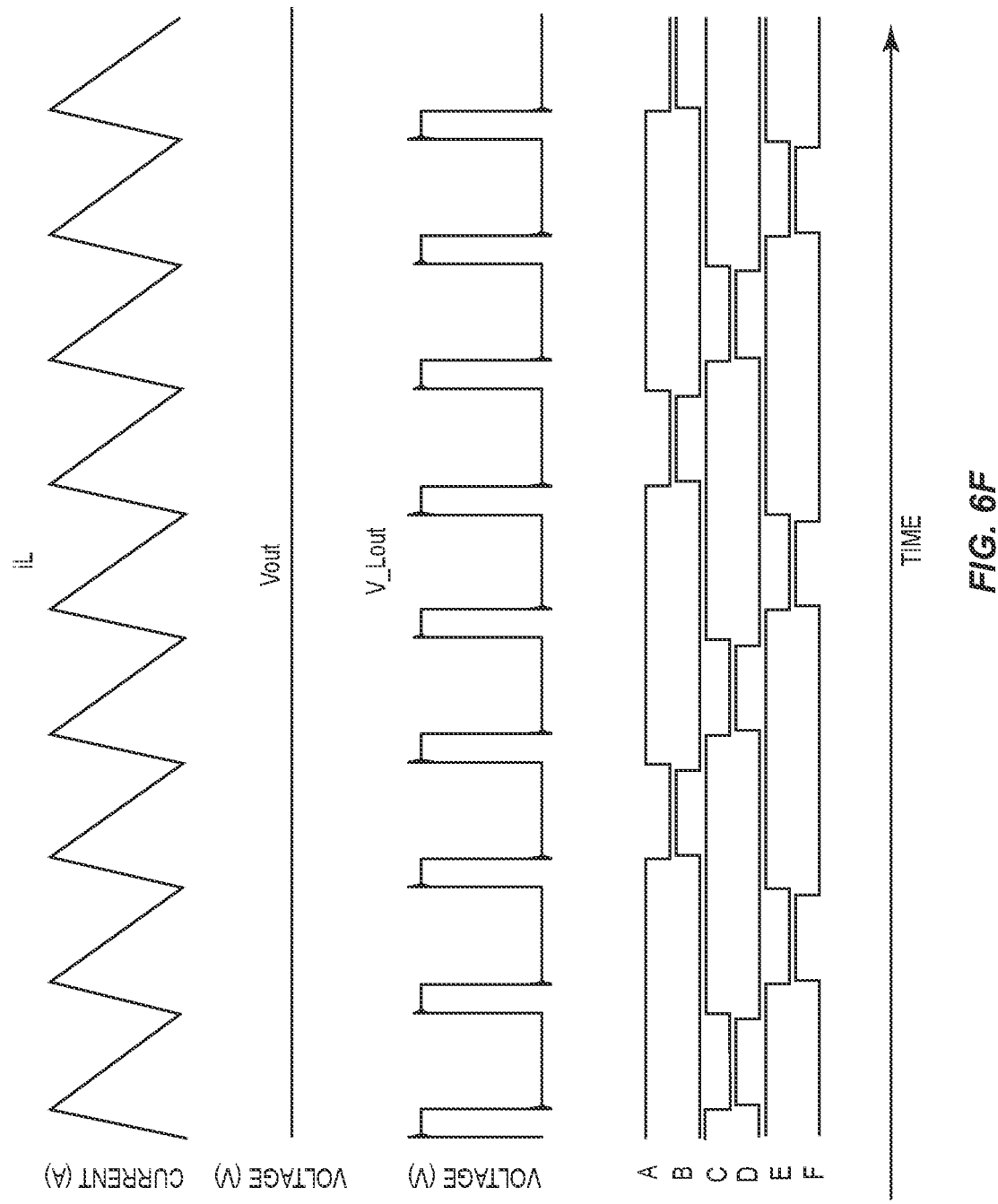
FIG. 6F illustrates the output inductor current, the output voltage of the power converter, and the output inductor voltage as a function of the gate signals in the third mode of operation.

In state [t₁] in FIG. 6A, the high-side switch device 108 of the top (uppermost) and bottom (lowermost) post-regulator half bridge converter stages 106 are on as shown in FIG. 6C. In this state, 2·Vdcx_out is applied to the output filter Lout, Cout of the power converter. The controller 112 alternates which of the two (2) post-regulator half bridge converter stages 106 are on at the same time so as to apply their respective high-side to the output filter Lout, Cout of the power converter in an alternating sequence, as shown in FIGS. 6D and 6E.

Generalizing the third mode of operation for N post-regulator half bridge converter stages 106, the controller 112 may implement a phase shifted duty cycle for the post-regulator half bridge converter stages 106 that is greater than (N−1)/N such that voltage levels applied to the output inductor Lout range between (N−1)*Vdcx_out and N*Vdcx_out, where Vdcx_out is the voltage of a single isolated DC output of the solid-state transformer 102 and N is the number of post-regulator half bridge converter stages 106 included in the power converter. Also, $\text{duty}_{Lout}$=(Vout−(N−1)*Vdcx_out)/Vdcx_out. For a phase-shifted duty cycle between m/N and (m+1)/N, with m<=(N−1), $\text{duty}_{Lout}$= (Vout−m*Vdcx_out)/Vdcx_out.

The modulation principle illustrated in FIGS. 4A through 6E may be extended to any number ($n_{stages}$) of post-regulation half bridge converter stages 106, therefore having an additional $n_{stages}$ modes of operation, each additional mode of operation being a combination of overlapping on-states for a number of high-side switch devices 108 of the post-regulation half bridge converter stages 106 from 1, 2, 3 up to $n_{stages}$.

The off-line power supply system described herein may be used in battery charger or other applications that require a wide output range to support different types of batteries using the same converter. For example, the off-line power supply may have an ac input voltage range of 200 Vac to 265 Vac and a DC output voltage range of 200 Vdc to 900 Vdc at an efficiency of 97% over an ambient temperature operating range of −25° C. to 45° C.

The front-end PFC stage 100 of the power converter may be implemented by an interleaved bridgeless totem-pole, e.g., capable of achieving peak efficiencies in a range of 99%. The solid-state transformer 102 may be implemented by a half-bridge LLC, e.g., capable of achieving peak efficiencies of 99% at relative high frequencies, reducing the volume of the transformer 114. The series buck converter 104 coupled to the solid-state transformer 102 has two or more post-regulation half bridge converter stages 106 that share an output inductor Lout and may achieve peak efficiencies in excess of 99% at relatively high frequencies. With such a configuration, the off-line power supply system can have 97% of efficiency target of the full system, with a good utilization of the components and good heat distribution, advantageous due to the space constraints and dissipation requirements.

The output inductor Lout may be wound on a ferrite ER32 core with 10 turns of Litz (multistrand) wire, for example. With this configuration, the absolute peak flux at the maximum output current would be 0.307 T, with some margin under the saturation for overload and over-temperature operating conditions. Meanwhile, the peak flux of the hysteresis loop (for core loss calculation) depends on the effective duty over the inductor Lout, e.g., between zero and 85.42 mT. At this level of excitation, an acceptable level of core loss may be achieved for the inductor Lout.

For the solid-state transformer 102, the transformer 116 may be implemented in ER32 or PQ35 ferrite cores, depending on the final selection of switching frequency, for example. The winding may be planar or Litz wire, also depending on the final mechanical construction. The output filter inductor Lout may be stacked on top of the main transformer 116 to save space and core volume.

The off-line power supply system described herein has optimized core loss and current ripple over a single shared output inductor Lout, while distributing power equally between the multiple pre- and post-regulation stages 116, 106. Also, the power converter is fully bidirectional as indicated by the dashed lines with double arrows in FIGS. 1 through 3.

Although the present disclosure is not so limited, the following numbered examples demonstrate one or more aspects of the disclosure.

Example 1. A power converter, comprising: a solid-state transformer having a DC input and a plurality of isolated DC outputs; a half bridge converter stage for each isolated DC output of the solid-state transformer, wherein an input of each half bridge converter stage is connected to the corresponding isolated DC output and an output of the half bridge converter stages are electrically connected in a cascade configuration; an output inductor shared by the half bridge converter stages and configured to deliver an output current; and a controller configured to implement phase shift control of the half bridge converter stages relative to one another, based on the number of half bridge converter stages and an output voltage of the power converter being regulated, such that each half bridge converter stage processes the full output current but only a fraction of the output voltage.

Example 2. The power converter of example 1, wherein the output inductor is a single physical inductor connected to the output of the top half bridge converter stage in the cascade configuration, and wherein a primary side of the solid-state transformer is a full-bridge resonant converter.

Example 3. The power converter of example 2, wherein the solid-state transformer is controlled at a fixed frequency, and wherein the primary side and a secondary side of the solid-state transformer are both controlled by the same PWM (pulse width modulation).

Example 4. The power converter of example 1, wherein the output inductor comprises a first winding connected to a low-side input of the bottom half bridge converter stage in the cascade configuration and a second winding connected to the output of the top half bridge converter stage in the cascade configuration.

Example 5. The power converter of example 4, wherein the output inductor is a common mode inductor, and wherein the first winding and the second winding are wound on a single core.

Example 6. The power converter of example 4 or 5, wherein a primary side of the solid-state transformer is a half-bridge resonant converter.

Example 7. The power converter of any of examples 1 through 6, wherein the DC input to the solid-state transformer is in a range of 380 Vdc to 440 Vdc, and wherein the controller is configured to regulate the output voltage of the power converter to a voltage in a range of 200 Vdc to 900 Vdc.

Example 8. The power converter of any of examples 1 through 7, further comprising a current sensor connected to the bottom half bridge converter stage in the cascade configuration and referenced to ground of the controller.

Example 9. The power converter of any of examples 1 through 8, wherein each half bridge converter stage has a voltage rating Vdc_rated that is a fraction of a maximum output voltage Vdc_max of the power converter, and wherein the fraction depends on the number N of half bridge converter stages included in the power converter such that Vdc_rated≥Vdc_max/N.

Example 10. The power converter of example 9, wherein Vdc_max=900 Vdc and N≥3.

Example 11. The power converter of example 9 or 10, wherein the controller is configured to phase shift a PWM (pulse width modulation) signal by 360°/N for controlling the half bridge converter stages.

Example 12. The power converter of any of examples 1 through 11, wherein the controller is configured to implement a phase shifted duty cycle for the half bridge converter stages that is less than 1/N such that voltage levels applied to the output inductor range between zero and Vdcx_out where Vdcx_out is the voltage of a single isolated DC output of the solid-state transformer and N is the number of half bridge converter stages included in the power converter.

Example 13. The power converter of any of examples 1 through 11, wherein the controller is configured to implement a phase shifted duty cycle for the half bridge converter stages that is in a range of 1/N to 2/N such that voltage levels applied to the output inductor range between Vdcx_out and 2*Vdcx_out where Vdcx_out is the voltage of a single isolated DC output of the solid-state transformer and N is the number of half bridge converter stages included in the power converter.

Example 14. The power converter of any of examples 1 through 11, wherein the controller is configured to implement a phase shifted duty cycle for the half bridge converter stages that is greater than (N−1)/N such that voltage levels applied to the output inductor range between (N−1)*Vdcx_out and N*Vdcx_out where Vdcx_out is the voltage of a single isolated DC output of the solid-state transformer and N is the number of half bridge converter stages included in the power converter.

Example 15. A method of controlling a power converter that includes a solid-state transformer having a DC input and a plurality of isolated DC outputs, a half bridge converter stage for each isolated DC output of the solid-state transformer, wherein an input of each half bridge converter stage is connected to the corresponding isolated DC output and an output of the half bridge converter stages are electrically connected in a cascade configuration, and an output inductor shared by the half bridge converter stages and configured to deliver an output current, the method comprising: implementing phase shift control of the half bridge converter stages relative to one another, based on the number of half bridge converter stages and an output voltage of the power converter being regulated, such that each half bridge converter stage processes the full output current but only a fraction of the output voltage.

Example 16. The method of example 15, wherein the DC input to the solid-state transformer is in a range of 380 Vdc to 440 Vdc, and wherein implementing the phase shift control of the half bridge converter stages comprises regulating the output voltage of the power converter to a voltage in a range of 200 Vdc to 900 Vdc.

Example 17. The method of example 15 or 16, wherein implementing the phase shift control of the half bridge converter stages comprises phase shifting a PWM (pulse width modulation) signal for controlling the half bridge converter stages by $$\frac{360°}{N}$$

where N is the number of half bridge converter stages included in the power converter.

Example 18. The method of any of examples 15 through 17, wherein implementing the phase shift control of the half bridge converter stages comprises implementing a phase shifted duty cycle for the half bridge converter stages that is less than 1/N such that voltage levels applied to the output inductor range between zero and Vdcx_out where Vdcx_out is the voltage of a single isolated DC output of the solid-state transformer and N is the number of half bridge converter stages included in the power converter.

Example 19. The method of any of examples 15 through 17, wherein implementing the phase shift control of the half bridge converter stages comprises implementing a phase shifted duty cycle for the half bridge converter stages that is in a range of 1/N to 2/N such that voltage levels applied to the output inductor range between Vdcx_out and 2*Vdcx_out where Vdcx_out is the voltage of a single isolated DC output of the solid-state transformer and N is the number of half bridge converter stages included in the power converter.

Example 20. The method of any of examples 15 through 17, wherein implementing the phase shift control of the half bridge converter stages comprises implementing a phase shifted duty cycle for the half bridge converter stages that is greater than (N−1)/N such that voltage levels applied to the output inductor range between (N−1)*Vdcx_out and N*Vdcx_out where Vdcx_out is the voltage of a single isolated DC output of the solid-state transformer and N is the number of half bridge converter stages included in the power converter.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to mean all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter, comprising:
    a solid-state transformer having a DC input and a plurality of isolated DC outputs;
    a half bridge converter stage for each isolated DC output of the solid-state transformer, wherein an input of each half bridge converter stage is connected to the corresponding isolated DC output and an output of the half bridge converter stages are electrically connected in a cascade configuration;
    an output inductor shared by the half bridge converter stages and configured to deliver an output current; and
    a controller configured to implement phase shift control of the half bridge converter stages relative to one another, based on the number of half bridge converter stages and an output voltage of the power converter being regulated, such that each half bridge converter stage processes the full output current but only a fraction of the output voltage.

2. The power converter of claim 1, wherein the output inductor is a single physical inductor connected to the output of the top half bridge converter stage in the cascade configuration, and wherein a primary side of the solid-state transformer is a full-bridge resonant converter.

3. The power converter of claim 2, wherein the solid-state transformer is controlled at a fixed frequency, and wherein the primary side and a secondary side of the solid-state transformer are both controlled by the same PWM (pulse width modulation).

4. The power converter of claim 1, wherein the output inductor comprises a first winding connected to a low-side input of the bottom half bridge converter stage in the cascade configuration and a second winding connected to the output of the top half bridge converter stage in the cascade configuration.

5. The power converter of claim 4, wherein the output inductor is a common mode inductor, and wherein the first winding and the second winding are wound on a single core.

6. The power converter of claim 4, wherein a primary side of the solid-state transformer is a half-bridge resonant converter.

7. The power converter of claim 1, wherein the DC input to the solid-state transformer is in a range of 380 Vdc to 440 Vdc, and wherein the controller is configured to regulate the output voltage of the power converter to a voltage in a range of 200 Vdc to 900 Vdc.

8. The power converter of claim 1, further comprising a current sensor connected to the bottom half bridge converter stage in the cascade configuration and referenced to ground of the controller.

9. The power converter of claim 1, wherein each half bridge converter stage has a voltage rating Vdc_rated that is a fraction of a maximum output voltage Vdc_max of the power converter, and wherein the fraction depends on the number N of half bridge converter stages included in the power converter such that Vdc_rated≥Vdc_max/N.

10. The power converter of claim 9, wherein Vdc_max=900 Vdc and N≥ 3.

11. The power converter of claim 9, wherein the controller is configured to phase shift a PWM (pulse width modulation) signal by $$\frac{360°}{N}$$

for controlling the half bridge converter stages.

12. The power converter of claim 1, wherein the controller is configured to implement a phase shifted duty cycle for the half bridge converter stages that is less than 1/N such that voltage levels applied to the output inductor range between zero and Vdcx_out where Vdcx_out is the voltage of a single isolated DC output of the solid-state transformer and N is the number of half bridge converter stages included in the power converter.

13. The power converter of claim 1, wherein the controller is configured to implement a phase shifted duty cycle for the half bridge converter stages that is in a range of 1/N to 2/N such that voltage levels applied to the output inductor range between Vdcx_out and 2*Vdcx_out where Vdcx_out is the voltage of a single isolated DC output of the solid-state transformer and N is the number of half bridge converter stages included in the power converter.

14. The power converter of claim 1, wherein the controller is configured to implement a phase shifted duty cycle for the half bridge converter stages that is greater than (N−1)/N such that voltage levels applied to the output inductor range between (N−1)*Vdcx_out and N*Vdcx_out where Vdcx_out is the voltage of a single isolated DC output of the solid-state transformer and N is the number of half bridge converter stages included in the power converter.

15. A method of controlling a power converter that includes a solid-state transformer having a DC input and a plurality of isolated DC outputs, a half bridge converter stage for each isolated DC output of the solid-state transformer, wherein an input of each half bridge converter stage is connected to the corresponding isolated DC output and an output of the half bridge converter stages are electrically connected in a cascade configuration, and an output inductor shared by the half bridge converter stages and configured to deliver an output current, the method comprising:
    implementing phase shift control of the half bridge converter stages relative to one another, based on the number of half bridge converter stages and an output voltage of the power converter being regulated, such that each half bridge converter stage processes the full output current but only a fraction of the output voltage.

16. The method of claim 15, wherein the DC input to the solid-state transformer is in a range of 380 Vdc to 440 Vdc, and wherein implementing the phase shift control of the half bridge converter stages comprises regulating the output voltage of the power converter to a voltage in a range of 200 Vdc to 900 Vdc.

17. The method of claim 15, wherein implementing the phase shift control of the half bridge converter stages comprises phase shifting a PWM (pulse width modulation) signal for controlling $$\frac{360°}{N}$$

the half bridge converter stages by where N is the number of half bridge converter stages included in the power converter.

18. The method of claim 15, wherein implementing the phase shift control of the half bridge converter stages comprises implementing a phase shifted duty cycle for the half bridge converter stages that is less than 1/N such that voltage levels applied to the output inductor range between zero and Vdcx_out where Vdcx_out is the voltage of a single isolated DC output of the solid-state transformer and N is the number of half bridge converter stages included in the power converter.

19. The method of claim 15, wherein implementing the phase shift control of the half bridge converter stages comprises implementing a phase shifted duty cycle for the half bridge converter stages that is in a range of 1/N to 2/N such that voltage levels applied to the output inductor range between Vdcx_out and 2*Vdcx_out where Vdcx_out is the voltage of a single isolated DC output of the solid-state transformer and N is the number of half bridge converter stages included in the power converter.

20. The method of claim 15, wherein implementing the phase shift control of the half bridge converter stages comprises implementing a phase shifted duty cycle for the half bridge converter stages that is greater than (N−1)/N such that voltage levels applied to the output inductor range between (N−1)*Vdcx_out and N*Vdcx_out where Vdcx_out is the voltage of a single isolated DC output of the solid-state transformer and N is the number of half bridge converter stages included in the power converter.

* * * * *

UNITED STATES PATENT AND TRADEMARK OFFICE
CERTIFICATE OF CORRECTION

PATENT NO. : 12,289,044 B2
APPLICATION NO. : 18/072065
DATED : April 29, 2025
INVENTOR(S) : M. Escudero Rodriguez et al.

Page 1 of 1

It is certified that error appears in the above-identified patent and that said Letters Patent is hereby corrected as shown below:

In the Claims

Column 16, Lines 29-35 (Claim 17) please change "controlling $^{360°/N}$ the" to -- controlling the half bridge converter stages by $^{360°/N}$ --

Signed and Sealed this
Eighth Day of July, 2025

Coke Morgan Stewart
*Acting Director of the United States Patent and Trademark Office*